United States Patent
Machida et al.

(10) Patent No.: US 6,794,476 B2
(45) Date of Patent: Sep. 21, 2004

(54) PROPYLENE HOMOPOLYMER AND PROPYLENE COPOLYMER

(75) Inventors: Shuji Machida, Chiba (JP); Takashi Saeki, Chiba (JP); Tomio Tatsumi, Chiba (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 109 days.

(21) Appl. No.: 10/070,442

(22) PCT Filed: Jul. 19, 2001

(86) PCT No.: PCT/JP01/06289

§ 371 (c)(1),
(2), (4) Date: Mar. 19, 2002

(87) PCT Pub. No.: WO02/08304

PCT Pub. Date: Jan. 31, 2002

(65) Prior Publication Data

US 2002/0198350 A1 Dec. 26, 2002

(30) Foreign Application Priority Data

Jul. 24, 2002 (JP) ........................................ 2000-221750

(51) Int. Cl.$^7$ .............................................. C08F 110/06
(52) U.S. Cl. ................. 526/351; 526/348.2; 526/348.4; 526/348.6; 525/416
(58) Field of Search .............................. 526/351, 348.6, 526/348.2, 348.4; 525/416

(56) References Cited

U.S. PATENT DOCUMENTS

| | | |
|---|---|---|
| 5,608,009 A | 3/1997 | Machida et al. |
| 5,629,254 A * | 5/1997 | Fukuoka et al. ............ 502/117 |
| 5,670,580 A | 9/1997 | Tazaki et al. |
| 5,739,225 A | 4/1998 | Tazaki et al. |
| 5,747,620 A | 5/1998 | Machida et al. |
| 5,955,557 A | 9/1999 | Machida et al. |
| 6,121,402 A | 9/2000 | Machida et al. |
| 6,169,154 B1 | 1/2001 | Machida et al. |

FOREIGN PATENT DOCUMENTS

| | | |
|---|---|---|
| JP | 8-53509 | 2/1996 |
| JP | 11-292912 | 10/1999 |
| JP | 2000-95808 | 4/2000 |
| JP | 2001-64314 | 3/2001 |

* cited by examiner

*Primary Examiner*—William Cheung
(74) *Attorney, Agent, or Firm*—Oblon, Spivak, McClelland, Maier & Neustadt, P.C.

(57) ABSTRACT

Provided are a propylene homopolymer in which a melt tension (MT), a Z average molecular weight (Mz) and a melt index (MI) (g/10 minutes) are specifically related and in which a difference in eluting temperatures and a maximum eluting temperature in programmed temperature fractional chromatography and a propylene copolymer in which a comonomer is specific α-olefin and a content thereof falls in a specific range and in which a melt tension (MT), a Z average molecular weight (Mz) and a melt index (MI) (g/10 minutes) are specifically related. The propylene homopolymer or the propylene copolymer of the present invention has physical properties equivalent to or not lower than those of conventional propylene polymers, and it can be controlled in a melt tension and is suited to foaming molding, sheet molding and blow molding. Further, it is excellent in melt-processing characteristics, molding stability and a recycling property and can be applied to molding methods which are restricted in use in conventional propylene polymers, for example, large size blow molding and extrusion foaming molding.

9 Claims, No Drawings

PROPYLENE HOMOPOLYMER AND PROPYLENE COPOLYMER

BACKGRAOUND OF THE INVENTION

The present invention relates to a propylene polymer, more specifically to a propylene polymer which has physical properties equivalent to or not lower than those of conventional propylene copolymers and is excellent in melt-processing characteristics, molding processability and a recycling property and which is suitably used particularly for large size blow molding, extrusion foaming molding and sheet molding and can be used for a raise in the performances of polyolefin composite materials and elastomers.

RELATED ART

Polypropylene is used in a wide range in a lot of the fields making the best use of the excellent characteristics thereof.

In conventional polypropylenes, however, the melt tension and the melt viscoelasticity are short, and the stability in parison in large size blow molding is inferior. Accordingly, the phenomenon of drawdown is liable to take place, and it used to be difficult to mold large-sized parts. Further, when the molecular weight is increased in order to elevate the melt tension, brought about is the problem that it is reduced in a melt fluidity and therefore can not be applied to molding of complicated shapes.

Further, in the field of foamed molded articles, requirements to foamed molded articles having a heat resistance as well as a reduction in weight, a heat insulating property and a damping property grow large, and polypropylene foamed molded articles are expected. However, the existing situation is that conventional polypropylenes are short of a melt tension, and sufficiently satisfactory foamed molded articles are less liable to be obtained.

The extrusion molding processability has to be improved in order to further expand the application field of this polypropylene. A melt processability of polyolefin has so far been tried to be improved in various ways, and there have been tried, for example, a method in which a polymerization catalyst and a polymerization procedure in producing polyolefin are improved to expand the molecular weight distribution thereof to thereby improve the melt processability and a method in which polyolefin is partially cross-linked to improve the melt processability.

On the other hand, in ethylene polymers, proposed in recent years is an ethylene polymer improved in a melt tension by a catalyst system in which a metallocene catalyst is combined with aluminoxane while the molecular weight distribution is narrow (Japanese Patent Application Laid-Open No. 213306/1992). Further, in respect to ethylene polymers produced with an constrained geometry catalyst, it is disclosed that the melt tension is improved though the molecular weight distribution is narrow as well (Japanese Patent Application Laid-Open No. 163088/1991), and the presence of a long branched chain is indicated. In the formation of this long branched chain, proposed is a mechanism in which an ethylene polymer in which a vinyl group is present at a molecular chain end is produced in polymerization and in which this is polymerized again in the form of a macro monomer. Further, disclosed as well is branched polyolefin comprising a homopolymer or a copolymer of α-olefin having 2 to 30 carbon atoms as a principal chain and a homopolymer or a copolymer of α-olefin having 250 or more carbon atoms as a side chain (Japanese Patent Application (through PCT) Laid-Open No. 502303/1996), and a method of passing through the production of a macro monomer of a terminal vinyl type is shown as a method for forming a side chain of the above branched polyolefin. However, (1) it is shown that the macro monomer is produced by β hydrogen transfer, but when propylene is used, an internal olefin or a vinylidene structure is formed by β hydrogen transfer, and a macro monomer having terminal vinyl is not produced; (2) it is shown as a method for obtaining a macro monomer other than ethylene that ethylene is added at the [end] stage of the polymerization reaction to [cap] it with ethylene to thereby produce the macro monomer, and it is apparent that ethylene is essential for producing the macro monomer; and (3) because of very quick chain reaction at a polymerization reaction stage in the methods of (1) and (2), a macro monomer of a block type is not produced by β hydrogen transfer after a block copolymer with ethylene is produced even if introducing ethylene, and it is apparent that as a matter of fact, the macro monomer of ethylene alone is produced, so that the above method is a technique limited to an ethylene polymer. Thus, a technique for producing branches by α-olefin higher than propylene is neither disclosed nor indicated.

In general, the introduction of a long chain branch into a polymer chain elevates the melt processing characteristics by the branch. A branched polymer in which a branched chain is constituted by a monomer different from a monomer constituting a principal chain polymer lowers an interfacial tension between different kinds of polymers in the field of a so-called composite material comprising different kinds of polymers to elevate the dispersibility of the polymers and makes it possible to effectively provide such incompatible physical properties as an impact strength and a rigidity. Further, it has a micro phase separation structure and therefore can be applied to various elastomers. In the polyolefin field, however, there is restriction in introducing branches, and therefore there have been limits in developing the applications thereof. If this becomes possible, the application fields thereof are expected to be expanded to a large extent by virtue of excellent mechanical properties and environmental compatibility represented by a recycling property which are intrinsically endowed to polyolefins.

On the other hand, there have so far been tried as a method for improving a melt tension of polypropylene and elevating melt processing characteristics thereof, (1) a method in which blended is high density polyethylene having a high melt tension and a high molecular weight (Japanese Patent Publication 55868/1994), (2) a method in which blended is high density polyethylene having a high melt tension produced with a chromium catalyst (Japanese Patent Application Laid-Open No. 92438/1996), (3) a method in which blended is low density polyethylene produced by a conventional high pressure radical polymerization method, (4) a method in which conventional polypropylene is irradiated with light to thereby elevate the melt tension, (5) a method in which conventional polypropylene is irradiated with light in the presence of a cross-linking agent and peroxide to thereby elevate the melt tension, (6) a method in which conventional polypropylene is grafted with a radically polymerizable monomer such as styrene and (7) a method in which propylene is copolymerized with polyene (Japanese Patent Application Laid-Open No. 194778/1993 and Japanese Patent Application Laid-Open No. 194779/1993).

In the methods of (1) to (3), however, the components for elevating the melt tension are short of an elastic modulus, a strength and a heat resistance, and therefore the intrinsic characteristics of polypropylene can not be prevented from being damaged. Further, involved in the methods of (4) and (5) are the problems that it is difficult to control a cross-linking reaction which takes place as a side reaction to bring about the inferior appearance by the production of gel and exert an adverse effect on the mechanical characteristics and that in addition thereto, there is a limit in optionally controlling the molding processability and the controlling range is narrow. Further, not only the heat stability is low, and the melt tension is reduced in melt molding processing to bring about a problem on the moldability but also recycling of the resin is hindered to a large extent. Further, in the method of (6), a chemical stability of polypropylene is damaged, and a problem is caused on a recycling property of a resin in a graft polymer of a styrene. Also, in the method of (7), not only an effect for improving the melt tension is small, and the satisfactory effect is not exhibited, but also the production of gel is concerned.

Further, the molding processability is controlled by the expansion of the molecular weight distribution as another conventional method for controlling molding processability. However, the expansion of the molecular weight distribution results in an increase in the low molecular weight component. This results in bringing about demerits such as a deterioration in the surface characteristic of the molded matter, a reduction in the mechanical properties and a lowering in the heat sealing property. A reduction in such physical properties can not be ignored to expect a rise in the satisfactory processing characteristics in excess.

Under such circumstances, an object of the present invention is to provide a branched propylene polymer which has physical properties equivalent to or not lower than those of conventional propylene polymers, which has a satisfactory melt tension, melt viscoelasticity and melt fluidity and is excellent in melt-processing characteristics, molding stability and a recycling property and which is suitably used particularly for large size blow molding, extrusion foaming molding and sheet molding and is suited to a raise in the performances of polyolefin composite materials and elastomers.

Further, another object of the present invention is to provide a branched propylene polymer which is less reduced in physical properties even when the melt-processing characteristics are elevated by controlling the molecular weight distribution.

DISCLOSURE OF THE INVENTION

Intensive researches repeated by the present inventors in order to develop a propylene polymer which is excellent in melt-processing characteristics, molding stability and a recycling property have resulting in finding that capable of meeting the object described above is a propylene homopolymer in which a specific relation is present between a melt tension (MT), a Z average molecular weight (Mz) and a melt index (MI) (g/10 minutes) and in which a specific relation is present between a difference in eluting temperatures in programmed temperature fractional chromatography and a maximum eluting temperature or a propylene copolymer in which the comonomer is a specific α-olefin and the content thereof falls in a specific range and in which a specific relation is present between a melt tension (MT), a Z average molecular weight (Mz) and a melt index (MI) (g/10 minutes). The present invention has been completed based on such knowledge.

That is, the present invention provides a propylene homopolymer characterized by that:
(a) a melt tension (MT) measured at a temperature of 230° C., a Z average molecular weight (Mz) determined by gel permeation chromatography and a melt index (MI) (g/10 minutes) measured at a temperature of 230° C. and a load of 21.2N satisfy the relation of an equation (1):

$$\log MT \geq 0.555 \times \log[Mz/MI] - 2.85 \quad (1)$$

and
(b) a difference $[T_{60}-T_{40}]$ in eluting temperatures and a maximum eluting temperature $T_{max}$ (° C.) in programmed temperature fractional chromatography satisfy both of:

$$\log[T_{60}-T_{40}] \leq 0.232 T_{max} + 25.70 \quad (2)$$

$$T_{60}-T_{40} \leq 80 \quad (3)$$

in a range where $T_{max}$ is 110° C. or lower, wherein $T_{60}$ represents a temperature (° C.) at which 60% by weight of the components is eluted, and $T_{40}$ represents a temperature (° C.) at which 40% by weight of the components is eluted, or satisfy the relation of:

$$T_{60}-T_{40} \leq 1.51 \quad (4)$$

in a range where $T_{max}$ exceeds 110° C. and is 130° C. or lower, and a propylene copolymer characterized by that:
(c) it is a propylene copolymer prepared by random-copolymerizing or block-copolymerizing propylene with at least one comonomer selected from ethylene and α-olefins having 4 to 20 carbon atoms and has a comonomer content of 0.05 to 60 mole %, and
(d) a melt tension (MT) measured at a temperature of 230° C., a Z average molecular weight (Mz) determined by gel permeation chromatography and a melt index (MI) (g/10 minutes) measured at a temperature of 230° C. and a load of 21.2N satisfy the relation of the equation (1):

$$\log MT \geq 0.555 \times \log[Mz/MI] - 2.85 \quad (1)$$

BEST MODE FOR CARRYING OUT THE INVENTION

First, in the propylene homopolymer of the present invention,
(a) the melt tension (MT) measured at a temperature of 230° C., the Z average molecular weight (Mz) determined by gel permeation chromatography and the melt index (MI) (g/10 minutes) measured at a temperature of 230° C. and a load of 21.2N satisfy the relation of the equation (1):

$$\log MT \geq 0.555 \times \log[Mz/MI] - 2.85 \quad (1)$$

preferably $$\log MT \geq 0.555 \times \log[Mz/MI] - 2.80 \quad (1a)$$

more preferably $$\log MT \geq 0.555 \times \log[Mz/MI] - 2.75 \quad (1b)$$

and further preferably $$\log MT \geq 0.555 \times \log[Mz/MI] - 2.62 \quad (1c)$$

If the propylene homopolymer does not satisfy the relation of the equation (1) described above, the propylene homopolymer is reduced in a melt processability.

The melt index (MI) measured at a temperature of 230° C. and a load of 21.2N falls preferably in a range of 0.01 to 1000 g/10 minutes, more preferably 0.05 to 900 g/10 minutes and further preferably 0.1 to 700 g/10 minutes. If the MI is smaller than 0.01 g/10 minutes, the propylene homopolymer is reduced in a melt fluidity and therefore is likely to be reduced in a processing performance. On the other hand, if the MI exceeds 1000 g/10 minutes, the propylene homopolymer is likely to be reduced in mechanical properties. The melt tension (MT), the Z average molecular weight (Mz) and the melt index (MI) each described above are determined by methods described later.

Further, in the propylene homopolymer of the present invention, (b) the difference [$T_{60}$–$T_{40}$] in the eluting temperatures and the maximum eluting temperature $T_{max}$ (° C.) in programmed temperature fractional chromatography satisfy the relation of:

$$log[T_{60}-T_{40}] \leq -0.232T_{max}+25.70 \quad (2)$$

in a range where $T_{max}$ is 110° C. or lower, preferably $$log[T_{60}-T_{40}] \leq -0.212T_{max}+23.50 \quad (2a)$$

more preferably $$log[T_{60}-T_{40}] \leq -0.182T_{max}+20.20 \quad (2b)$$

further preferably $$log[T_{60}-T_{40}] \leq -0.160T_{max}+17.80 \quad (2c)$$

and most preferably $$log[T_{60}-T_{40}] \leq -0.130T_{max}+14.48 \quad (2d)$$

If the propylene homopolymer does not satisfy the relation of the equation (2) described above, a sticky component having a low molecular weight is produced, and when the propylene homopolymer is molded into an article, the molded article is deteriorated in a surface characteristic. In this connection, the lower limit of log[$T_{60}$–$T_{40}$] is preferably $$log[T_{60}-T_{40}] \geq -0.0088T_{max}+0.30 \quad (8)$$

If log[$T_{60}$–$T_{40}$] is less than $-0.0088T_{max}+0.30$, a sticky component having a low molecular weight is extremely reduced, and therefore caused is no problem that the molded article of the propylene homopolymer is deteriorated in a surface characteristic. However, a heat sealing temperature width in the film and the like becomes narrow, so that a range in the optimum processing condition becomes narrow, and a problem in terms of practical use is likely to be brought about.

In a range where $T_{max}$ is 110° C. or lower, required to be satisfied together with the equation (2) is:

$$T_{60}-T_{40} \leq 80 \quad (3)$$

preferably $$T_{60}-T_{40} \leq 70 \quad (3a)$$

most preferably $$T_{60}-T_{40} \leq 60 \quad (3b)$$

If $T_{60}$–$T_{40}$ exceeds 80° C., it results in a sudden increase in a low stereoregular component having a low molecular weight to deteriorate the appearance of the film and lower the blocking property, and therefore it is not preferred.

The preferred area is an area in which the maximum eluting temperature falls in a range of 20 to 110° C. and which is decided by (2) to (2d), (3) to (3b) and (8) described above.

Further, the difference [$T_{60}$–$T_{40}$] in the eluting temperatures and the maximum eluting temperature $T_{max}$ (° C.) have to satisfy the following equation in a range where $T_{max}$ exceeds 110° C. and is 130° C. or lower:

$$T_{60}-T_{40} \leq 1.51 \quad (4)$$

preferably $$log[T_{60}-T_{40}] \leq -0.002T_{max}+0.40 \quad (4a)$$

more preferably $$log[T_{60}-T_{40}] \leq -0.004T_{max}+0.62 \quad (4b)$$

further preferably $$log[T_{60}-T_{40}] \leq -0.006T_{max}+0.84 \quad (4c)$$

and most preferably $$log[T_{60}-T_{40}] \leq -0.008T_{max}+1.06 \quad (4d)$$

If $T_{60}$–$T_{40}$ exceeds 1.51° C., stickiness is produced by an increase in a low stereoregular component to deteriorate the appearance of the film and lower the blocking property, and therefore it is not preferred. In this connection, the lower limit of log[$T_{60}$–$T_{40}$] is the same as in the equation (8) described above. Provided that the maximum eluting temperature $T_{max}$ falls in a range of exceeding 110° C. and 130° C. or lower.

The preferred area is an area in which the maximum eluting temperature falls in a range of exceeding 110° C. and 130° C. or lower and which is decided by (4) to (4d) and (8) described above.

The propylene copolymer of the present invention is (c) a propylene copolymer prepared by random-copolymerizing or block-copolymerizing propylene with at least one comonomer selected from ethylene and α-olefins having 4 to 20 carbon atoms and satisfies the condition that the comonomer has a content of 0.05 to 60 mole %. The α-olefin having 4 to 20 carbon atoms includes 1-butene, 3-methyl-1-butene, 1-pentene, 1-hexene, 4-methyl-1-pentene, 1-octene, 1-decene, 1-dodecene, 1-tetradecene, 1-hexadecene, 1-octadecene and 1-eicocene.

The comonomer has a content of preferably 0.1 to 50 mole %, more preferably 0.2 to 40 mole % and further preferably 0.3 to 25 mole %. If the comonomer has a content of less than 0.05 mole %, the mechanical properties such as the flexibility have no difference from those of a propylene homopolymer, and the propylene copolymer of the present invention shall not be suited to the field in which such properties are required. On the other hand, if the comonomer has a content exceeding 60 mole %, an extent of softening is notably shown, and a component having a low molecular weight and containing a large amount of the comonomer is contained, so that brought about is the problem that the surface is sticky. Accordingly, both are not preferred.

The block copolymer is a polymer comprising a propylene homopolymer part and a copolymer part comprising propylene and ethylene or at least one α-olefin having 4 to 20 carbon atoms, and the comonomer in this copolymer part has a content of preferably 1 to 70 mole %. Further, the copolymer part has a proportion of preferably 5 to 80% by weight based on the whole block copolymer. The block copolymer is preferably a copolymer comprising a propylene homopolymer part, a copolymer part [1] comprising propylene and ethylene or at least one α-olefin having 4 to 20 carbon atoms and a copolymer part [2] in which a copolymer composition and/or the kind of the comonomer are different from those of the copolymer part [1]. In this case, the copolymer part [1] or [2] has a comonomer content of preferably 0.2 to 70 mole %, and the copolymer part [2] has a proportion of preferably 0.5 to 80% by weight based on the whole weight of the block copolymer.

Further, in the propylene copolymer of the present invention, (d) the melt tension (MT) measured at a temperature of 230° C., the Z average molecular weight (Mz) determined by gel permeation chromatography and the melt index (MI) (g/10 minutes) measured at a temperature of 230° C. and a load of 21.2N satisfy the relation of the equation (1):

$$\log MT \geq -0.555 \times \log[Mz/MI] - 2.85 \tag{1}$$

and the preferred ranges in the equation (1) are the same as those explained in (a) described above.

In the propylene copolymer of the present invention, the difference $[T_{60}-T_{40}]$ in the eluting temperatures and the maximum eluting temperature $T_{max}$ (° C.) in programmed temperature fractional chromatography satisfy both of:

$$\log[T_{60}-T_{40}] \leq 0.047 T_{max} + 5.240 \tag{5}$$

$$T_{60}-T_{40} \leq 80 \tag{6}$$

in a range where $T_{max}$ is 102° C. or lower, wherein $T_{60}$ represents a temperature (° C.) at which 60% by weight of the components is eluted, and $T_{40}$ represents a temperature (° C.) at which 40% by weight of the components is eluted, or satisfy the relation of:

$$T_{60}-T_{40} \leq 2.79 \tag{7}$$

in a range where $T_{max}$ exceeds 102° C. and is 125° C. or lower. The equation (5) described above is preferably $$\log[T_{60}-T_{40}] \leq -0.040 T_{max} + 4.526 \tag{5a}$$

more preferably $$\log[T_{60}-T_{40}] \leq -0.035 T_{max} + 4.016 \tag{5b}$$

most preferably $$\log[T_{60}-T_{40}] \leq 0.028 T_{max} + 3.302 \tag{5c}$$

If the propylene copolymer does not satisfy the relation of the equation (5) described above, a sticky component having a low molecular weight is produced, and when the propylene copolymer is molded into an article, the molded article is deteriorated in a surface characteristic. In this connection, the lower limit of $\log[T_{60}-T_{40}]$ is preferably $$\log[T_{60}-T_{40}] \geq -0.0088 T_{max} + 0.30 \tag{8}$$

If $\log[T_{60}-T_{40}]$ is less than $-0.0088 T_{max}+0.30$, a sticky component having a low molecular weight is extremely reduced, and therefore caused is no problem that the molded article of the propylene copolymer is deteriorated in a surface characteristic. However, a heat sealing temperature width in the film and the like becomes narrow, so that a range in the optimum processing condition becomes narrow, and a problem in terms of practical use is likely to be brought about.

In a range where $T_{max}$ is 102° C. or lower, required to be satisfied together with the equation (5) is:

$$T_{60}-T_{40} \leq 80 \tag{6}$$

preferably $$T_{60}-T_{40} \leq 70 \tag{6a}$$

most preferably $$T_{60}-T_{40} \leq 60 \tag{6b}$$

If $T_{60}-T_{40}$ exceeds 80° C., it results in a sudden increase in a low stereoregular component having a low molecular weight to deteriorate the appearance of the film and lower the blocking property, and therefore it is not preferred.

The preferred area is an area in which the maximum eluting temperature falls in a range of 20 to 102° C. and which is decided by (5) to (5d), (6) to (6b) and (8) described above.

Further, the difference $[T_{60}-T_{40}]$ in the eluting temperatures and the maximum eluting temperature $T_{max}$ (° C.) have to satisfy the following equation in a range where $T_{max}$ exceeds 102° C. and is 125° C. or lower:

$$T_{60}-T_{40} \leq 2.79 \tag{7}$$

preferably $$\log[T_{60}-T_{40}] \geq -0.0016 T_{max} + 0.609 \tag{7a}$$

more preferably $$\log[T_{60}-T_{40}] \geq -0.0052 T_{max} + 0.976 \tag{7b}$$

further preferably $$\log[T_{60}-T_{40}] \geq -0.0088 T_{max} + 1.343 \tag{7c}$$

further more preferably $$\log[T_{60}-T_{40}] \geq -0.0124 T_{max} + 1.710 \tag{7d}$$

and most preferably $$\log[T_{60}-T_{40}] \geq -0.0152 T_{max} + 1.996 \tag{7e}$$

If $T_{60}-T_{40}$ exceeds 2.79° C., stickiness is produced by an increase in a low stereoregular component to deteriorate the appearance of the film and lower the blocking property, and therefore it is not preferred. In this connection, the lower limit of $\log[T_{60}-T_{40}]$ is the same as in the equation (8) described above. Provided that the maximum eluting temperature $T_{max}$ falls in a range of exceeding 102° C. and 125° C. or lower.

The preferred area is an area in which the maximum eluting temperature falls in a range of exceeding 102° C. and 125° C. or lower and which is decided by (7) to (7e) and (8) described above.

The propylene copolymer of the present invention shall not specifically be restricted in a molecular weight distribution. However, considering that the propylene copolymer having the present parameter can suitably be produced by a production process carried out by two stage polymerization and using two kinds of catalysts, the molecular weight distribution tends to expand.

Accordingly, the molecular weight distribution shown by Mw/Mn in the propylene copolymer of the present invention is 1.5<Mw/Mn≦30, preferably 1.8<Mw/Mn≦30, more preferably 2<Mw/Mn≦30 and further more preferably 2.5<Mw/Mn≦30, and as it is restricted in the following way, it is more preferred:

3.0<Mw/Mn≦30
3.5<Mw/Mn≦30

$4.0<Mw/Mn\leq30$ $4.1<Mw/Mn\leq30$ $4.2<Mw/Mn\leq30$

In addition to the conditions described above, a change rate ($MT_1/MT_0$) of a melt tension caused by heat history in the propylene homopolymer or the propylene copolymer of the present invention falls preferably in a range of 0.63 to 1, wherein $MT_0$ represents the melt tension of the propylene homopolymer or the propylene copolymer before subjected to heat history, and $MT_1$ represents the melt tension of the propylene homopolymer or the propylene copolymer after subjected to heat history. The $MT_1/MT_0$ is preferably 0.65 to 1, more preferably 0.68 to 1, further more preferably 0.71 to 1 and most preferably 0.74 to 1.

If the $MT_1/MT_0$ is less than 0.63, not only the resin can not be recycled, but also the yield is reduced, and the cost is likely to go up. That is, the propylene homopolymer or the propylene copolymer is subjected to heat history by passing through a melting step in mold-processing. The propylene homopolymer or the propylene copolymer which has been subjected to such heat history is usually recycled in high polymer processing. When the propylene homopolymer or the propylene copolymer is changed in a melt tension to a large extent by heat history, brought about is the trouble that the molding conditions can not finely be changed and molding itself can not be carried out. Accordingly, a propylene homopolymer or a propylene copolymer in which a rate of a change in a melt tension caused by heat history is small is required in the mold processing field and the recycling field. An evaluation method for this heat history shall be described later.

Further, a deterioration parameter D defined by a change rate ($DT_1/DT_0$) of a melt viscosity caused by heat history in the propylene homopolymer or the propylene copolymer of the present invention is 0.7 or more, preferably 0.8 or more and more preferably 0.9 or more, wherein $DT_0$ represents the melt viscosity of the propylene homopolymer or the propylene copolymer before subjected to heat history, and $DT_1$ represents the melt viscosity of the propylene homopolymer or the propylene copolymer after subjected to heat history.

If the deterioration parameter D is less than 0.7, the resin is notably deteriorated (the molecule is broken) and can not be reused. The deterioration parameter D is a value obtained by measuring the dynamic viscoelasticity before and after kneading to determine the storage modulus G' at a frequency of 0.01 rad/s and defined by the following equation:

$$D=G'_a/G'_b$$

wherein $G'_a$ is the storage modulus after kneading, and $G'_b$ is the storage modulus before kneading.

Capable of being used for producing the propylene homopolymer or the propylene copolymer of the present invention is a production process in which olefin is polymerized at a multistage in the presence of an olefin polymerization catalyst comprising (A) at least two kinds of transition metal compounds of the fourth group in the periodic table and (B) at least one selected from the compound group consisting of an aluminumoxy compound (B-1) and an ionic compound (B-2) which can be converted to a cation by reacting with the transition metal compounds described above.

Either of a batch system and a continuous system may be used as a polymerization method in multistage polymerization, and capable of being employed is an optional method among slurry polymerization, gas phase polymerization, bulk polymerization and solution polymerization.

A polymerization solvent used when carrying out slurry polymerization or solution polymerization includes, for example, aliphatic hydrocarbons such as propane, butane, pentane, hexane, heptane, octane, decane, dodecane and kerosene; alicyclic hydrocarbons such as cyclopentane, cyclohexane and methylcyclohexane; aromatic hydrocarbons such as benzene, toluene and xylene; and halogenated hydrocarbons such as ethylene chloride, chlorobenzene, dichloromethane and chloroform. These solvents may be used alone or in a mixture of two or more kinds thereof.

An olefin polymer having a intrinsic viscosity of 0.01 to 20 dl/g is preferably produced at the first stage in multistage polymerization, and more preferably produced is an olefin polymer having a intrinsic viscosity of 0.05 to 10 dl/g. An olefin polymer having a intrinsic viscosity of 0.5 to 10 dl/g is preferably produced at the second stage, and more preferably produced is an olefin polymer having a intrinsic viscosity of 1.0 to 5 dl/g. The olefin polymer produced at the second stage has a proportion of usually 0.01 to 95% by weight, preferably 0.5 to 90% by weight and particularly preferably 1.0 to 85% by weight based on the whole weight of the olefin polymers.

In respect to the polymerization conditions, the polymerization temperature falls in a range of usually −50 to 200° C., preferably −20 to 150° C. and more preferably 0 to 120° C. The polymerization pressure falls in a range of usually 0 to 19.6 MPa·G, preferably 0.0098 to 14.7 MPa·G and more preferably 0.0196 to 9.8 MPa·G. The polymerization time falls in a range of usually 10 seconds to 5 hours, preferably 30 seconds to 3 hours and more preferably 1 minute to 2 hours.

It is preferred for obtaining an olefin polymer having a vinyl group at an end to use no hydrogen at least at one polymerization step. In multistage polymerization, the polymerization conditions at the first stage are preferably different from those at the second stage. Further, the use amount of the polymerization catalyst is preferably selected so that a mole ratio of the raw material monomer/component (A) described above is preferably 1 to $10^8$, more 100 to $10^7$.

The resulting propylene polymer may be controlled in a intrinsic viscosity (controlled in a molecular weight) by suitably selecting the use proportions of the respective components contained in the polymerization catalyst, the use amount of the polymerization catalyst, the polymerization temperature, the polymerization pressure and a chain transfer agent such as hydrogen in the ranges described above.

Capable of being given as the component (A) contained in the olefin polymerization catalyst is a transition metal compound of the fourth group in the periodic table having a ligand in which two indenyl groups having a substituent capable of controlling the solid structure of the polymer are cross-linked at five-membered ring parts via one or two cross-linking groups.

Used as the transition metal compound of the fourth group in the periodic table are two kinds of (1) a catalyst capable of producing an olefin polymer having a vinyl group at an end and (2) a catalyst for producing an olefin polymer having a vinyl group at an end with propylene and a copolymer (of ethylene with α-olefin having 4 to 20 carbon atoms). It shall by no means be restricted as long as it is a catalyst having the performances described above.

Examples given as the preferred catalyst include seven kinds of (A-1) heterogeneous cross-linking complex, (A-2) double cross-linking complex, (A-3) so-called Hochst and BASF type complexes and a transition metal complex having an azulenyl skeleton, (A-4) substituted Cp type complex, (A-5) bis Cp type complex, (A-6) mono Cp type complex and (A-7) constrained geometry complex.

Examples given as (1) the catalyst capable of producing an olefin polymer having a vinyl group at an end include Zr and Hf complexes of (A-1), Hf complex of (A-2), Zr and Hf complexes, preferably Hf complex of (A-3) and Zr and Hf complexes of (A-4).

Examples given as (2) the catalyst for producing an olefin polymer having a vinyl group at an end with propylene and a copolymer (of ethylene with α-olefin having 4 to 20 carbon atoms) include Zr complex of (A-2) and Zr and Hf complexes, preferably Zr complex of (A-3).

In respect to a use proportion of the catalyst (1) to the catalyst (2), a use amount of the catalyst (2) for producing an olefin polymer having a vinyl group at an end with propylene and a copolymer (of ethylene with α-olefin having 4 to 20 carbon atoms) is 1.0 to 99.9 mole %, preferably 5 to 99.9 mole %, more preferably 25 to 95 mole % and most preferably 50 to 90 mole % based on the whole amount of the transition metal compound of the fourth group in the periodic table.

(A-1) Heterogeneous Cross-Linking Complex

It is a transition metal compound shown by the following Formula (1):

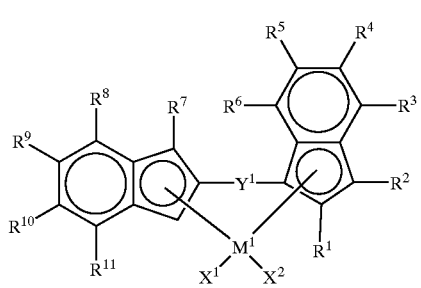

wherein $M^1$ represents titanium, zirconium or hafnium; $R^1$ to $R^{11}$, $X^1$ and $X^2$ each represent independently a hydrogen atom, a halogen atom, a hydrocarbon group having 1 to 20 carbon atoms, a halogen-containing hydrocarbon group having 1 to 20 carbon atoms, a silicon-containing group, an oxygen-containing group, a sulfur-containing group, a nitrogen-containing group or a phosphorus-containing group; $R^3$ and $R^4$ and $R^8$ and $R^9$ may be combined with each other to form rings; $X^1$ and $X^2$ each represent independently a halogen atom, a hydrocarbon group having 1 to 20 carbon atoms, a halogen-containing hydrocarbon group having 1 to 20 carbon atoms, a silicon-containing group, an oxygen-containing group, a sulfur-containing group, a nitrogen-containing group or a phosphorus-containing group; $Y^1$ is a divalent cross-linking group combining two ligands and represents a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —NR$^{12}$—, —PR$^{12}$, —P(O)R$^{12}$—, —BR$^{12}$— or —AlR$^{12}$—; and $R^{12}$ represents a hydrogen atom, a halogen atom, a hydrocarbon group having 1 to 20 carbon atoms or a halogen-containing hydrocarbon group having 1 to 20 carbon atoms.

In Formula (1) described above, the halogen atom represented by $R^1$ to $R^{11}$, $X^1$ and $X^2$ includes a chlorine atom, a bromine atom, a fluorine atom and an iodine atom. The hydrocarbon group having 1 to 20 carbon atoms includes, for example, alkyl groups such as methyl, ethyl, n-propyl, isopropyl, n-butyl, isobutyl, tert-butyl, n-hexyl and n-decyl, aryl groups such as phenyl, 1-naphthyl and 2-naphthyl and aralkyl groups such as benzyl. The halogen-containing hydrocarbon group having 1 to 20 carbon atoms includes groups such as trifluoromethyl, in which at least one hydrogen atom contained in the hydrocarbon groups described above is substituted with a suitable halogen atom. The silicon-containing group includes trimethylsilyl and dimethyl(t-butyl)silyl. The oxygen-containing group includes methoxy and ethoxy. The sulfur-containing group includes a thiol group and a sulfonic acid group. The nitrogen-containing group includes a dimethylamino group. The phosphorus-containing group includes a phenylphsophine group. Also, $R^3$ and $R^4$ and $R^8$ and $R^9$ may be combined with each other to form rings such as fluorene. Specific examples of $R^3$ and $R^4$ and $R^8$ and $R^9$ include the groups given in $R^1$ to $R^{11}$ described above excluding a hydrogen atom. A hydrogen atom and an alkyl group having 6 or less carbon atoms are preferred as $R^4$ and $R^8$, and a hydrogen atom, methyl, ethyl, isopropyl and cyclohexyl are more preferred. A hydrogen atom is particularly preferred. An alkyl group having 6 or less carbon atoms is preferred as $R^3$, $R^6$, $R^8$ and $R^{11}$, and methyl, ethyl, isopropyl and cyclohexyl are more preferred. Isopropyl is particularly preferred. A hydrogen atom is preferred as $R^4$, $R^5$, $R^7$, $R^9$ and $R^{10}$. $X^1$ and $X^2$ are preferably a halogen atom, methyl, ethyl and propyl.

The specific example of $Y^1$ include methylene, ethylene, ethylidene, isopropylidene, cyclohexylidene, 1,2-cyclohexylene, dimethylsilylene, tetramethyldisilylene, dimethylgermylene, methylboridene (CH$_3$—B═), methylalumilidene (CH$_3$—Al═), phenylphosphilidene (Ph—P═), phenylphospholidene (PhPO═), 1,2-phenylene, vinylene (—CH═CH—), vinylidene (CH$_2$═C═), methylimide, oxygen (—O—) and sulfur (—S—). Among them, methylene, ethylene, ethylidene and isopropylidene are preferred.

$M^1$ represents titanium, zirconium or hafnium, and particularly hafnium is suited. The specific examples of the transition metal compound shown by Formula (1) described above include 1,2-ethanediyl(1-(4,7-diisopropylindenyl))(2-(4,7-diisopropylindenyl))hafnium dichloride, 1,2-ethanediyl (9-fluorenyl)(2-(4,7-diisopropylindenyl))hafnium dichloride, isopropylidene(1-(4,7-diisopropylindenyl))(2-(4,7-diisopropylindenyl))hafnium dichloride, 1,2-ethanediyl(1-(4,7-dimethylindenyl))(2-(4,7-diisopropylindenyl))hafnium dichloride, 1,2-ethanediyl(9-fluorenyl)(2-(4,7-dimethylindenyl))hafnium dichloride, isopropylidene(1-(4, 7-dimethylindenyl))(2-(4,7-diisopropylindenyl))hafnium dichloride, and compounds obtained by substituting hafniums contained in these compounds with zirconium or titanium. However, they shall not be restricted to these compounds.

The transition metal compound shown by Formula (1) described above can be produced by a method described in Japanese Patent Laid-Open No. 130807/1999 filed previously by the present inventors. The compounds may be used as the (A-1) component in combination of two or more kinds thereof.

(A-2) Double Cross-Linking Complex

It is a transition metal compound shown by the following Formula (2):

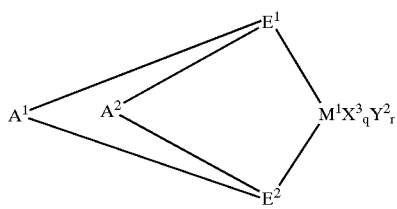

(2)

wherein $M^1$ represents titanium, zirconium or hafnium; $E^1$ and $E^2$ each represent independently a ligand selected from a cyclopentadienyl group, a substituted cyclopentadienyl group, an indenyl group, a substituted indenyl group, a heterocyclopentadienyl group, a substituted heterocyclopentadienyl group, an amide group, a phosphide group, a hydrocarbon group and a silicon-containing group and form a cross-linking structure via $A^1$ and $A^2$, and they may be the same as or different from each other; X represents a σ-bonding ligand, and when a plurality of $X^3$ is present, a plurality of $X^3$ may be the same or different and may be cross-linked with other $X^3$, $E^1$, $E^2$ or $Y^2$; $Y^2$ represents a Lewis base, and when a plurality of $Y^2$ is present, a plurality of $Y^2$ may be the same or different and may be cross-linked with other $Y^2$, $E^1$, $E^2$ or $X^3$; $A^1$ and $A^2$ are divalent cross-linking groups bonding two ligands and represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —$SO_2$—, —$NR^{12}$—, —$PR^{12}$—, —$P(O)R^{12}$—, —$BR^{12}$— or —$AlR^{12}$—; $R^{12}$ represents a hydrogen atom, a halogen atom, a hydrocarbon group having 1 to 20 carbon atoms or a halogen-containing hydrocarbon group having 1 to 20 carbon atoms, and they may be the same as or different from each other; q is an integer of 1 to 5 and represents [(atomic value of $M^1$)−2]; and r represents an integer of 0 to 3.

In the transition metal compound shown by Formula (2) described above, $M^1$ represents titanium, zirconium or hafnium, and zirconium and hafnium are suited. As described above, $E^1$ and $E^2$ each represent independently a ligand selected from a cyclopentadienyl group, a substituted cyclopentadienyl group, an indenyl group, a substituted indenyl group, a heterocyclopentadienyl group, a substituted heterocyclopentadienyl group, an amide group (—N<), a phosphide group (—P<), a hydrocarbon group (>CR—, >C<) and a silicon-containing group (>SiR—, >Si<) (provided that R represents a hydrogen atom, a hydrocarbon group having 1 to 20 carbon atoms or a hetero atom-containing group), and they form a cross-linking structure via $A^1$ and $A^2$. $E^1$ and $E^2$ may be the same as or different from each other. $E^1$ and $E^2$ are preferably a cyclopentadienyl group, a substituted cyclopentadienyl group, an indenyl group and a substituted indenyl group.

The specific examples of the σ-bonding ligand represented by $X^3$ include halogen atoms, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms and an acyl group having 1 to 20 carbon atoms. When a plurality of this $X^3$ is present, a plurality of $X^3$ may be the same or different and may be cross-linked with other $X^3$, $E^1$, $E^2$ or $Y^2$ On the other hand, amines, ethers, phosphines and thioethers can be given as the specific examples of the Lewis base represented by $Y^2$. When a plurality of this $Y^2$ is present, a plurality of $Y^2$ may be the same or different and may be cross-linked with other $Y^2$, $E^1$, $E^2$ or $X^3$. Next, at least one of the cross-linking groups represented by $A^1$ and $A^2$ is preferably a cross-linking group comprising a hydrocarbon group having one or more carbon atoms. These cross-linking groups include, for example, a group represented by:

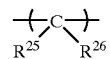

wherein $R^{25}$ and $R^{26}$ each represent independently a hydrogen atom or a hydrocarbon group having 1 to 20 carbon atoms; they may be the same as or different from each other and may be combined with each other to form a ring structure; and e represents an integer of 1 to 4. Capable of being given as the specific examples thereof are methylene, ethylene, ethylidene, propylidene, isopropylidene, cyclohexylidene, 1,2-cyclohexylene and vinylidene ($CH_2$=C=). Among them, methylene, ethylene and isopropylidene are suited. These $A^1$ and $A^2$ may be the same as or different from each other.

When $E^1$ and $E^2$ each are a cyclopentadienyl group, a substituted cyclopentadienyl group, an indenyl group or a substituted indenyl group in the transition metal compound shown by the following Formula (2), the bond of the cross-linking groups represented by $A^1$ and $A^2$ may be a (1,1') (2, 2') double cross-linking type or a (1,2') (2,1') double cross-linking type. Among such transition metal compounds shown by Formula (2), preferred is a transition metal compound shown by Formula (2-a) comprising a ligand of a double cross-linking type biscyclopentadienyl derivative.

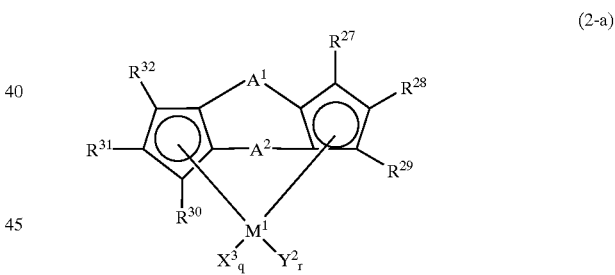

(2-a)

In Formula (2-a) described above, $M^1$, $A^1$, $A^2$, q and r are the same as those described above. $X^3$ represents a σ-bonding ligand, and when a plurality of $X^3$ is present, a plurality of $X^3$ may be the same or different and may be cross-linked with other $X^3$ or $Y^2$. The same ones as given as the examples in explaining $X^3$ in Formula (2) can be given as the specific examples of this $X^3$. $Y^2$ represents a Lewis base, and when a plurality of $Y^2$ is present, a plurality of $Y^2$ may be the same or different and may be cross-linked with other $Y^2$ or $X^3$. The same ones as given as the examples in explaining $Y^2$ in Formula (2) can be given as the specific examples of this $Y^2$. $R^{27}$ to $R^{32}$ each represent independently a hydrogen atom, a halogen atom, a hydrocarbon group having 1 to 20 carbon atoms, a halogen-containing hydrocarbon group having 1 to 20 carbon atoms, a silicon-containing group or a hetero atom-containing group, and it is required that at least one of them is not a hydrogen atom. $R^{27}$ to $R^{32}$ may be the same as or different from each other, and adjacent groups may be combined with each other to form rings.

In the transition metal compound comprising a ligand of a double cross-linking type biscyclopentadienyl derivative, the ligand may be a (1,1') (2,2') double cross-linking type or a (1,2') (2,1') double cross-linking type. Capable of being given as the specific examples of the transition metal compound shown by this Formula (2) are (1,1'-ethylene)(2,2'-ethylene)-bis(indenyl)zirconium dichloride, (1,2'-ethylene) (2,1'-ethylene)-bis(indenyl)zirconium dichloride, (1,1'-methylene)(2,2'-methylene)-bis(indenyl)zirconium dichloride, (1,2'-methylene)(2,1'-methylene)-bis(indenyl) zirconium dichloride, (1,1'-isopropylidene)(2,2'-isopropylidene)-bis(indenyl)zirconium dichloride, (1,2'-isopropylidene)(2,1'-isopropylidene)-bis(indenyl)zirconium dichloride, (1,1'-ethylene)(2,2'-ethylene)-bis(3-methylindenyl)zirconium dichloride, (1,2'-ethylene)(2,1'-ethylene)-bis(3-methylindenyl)zirconium dichloride, (1,1'-ethylene)(2,2'-ethylene)-bis(4,5-benzoindenyl)-zirconium dichloride, (1,2'-ethylene)(2,1'-ethylene)-bis(4,5-benzoindenyl)zirconium dichloride, (1,1'-ethylene)(2,2'-ethylene)-bis(4-isopropylindenyl)zirconium dichloride, (1,2'-ethylene)(2,1'-ethylene)-bis(4-isopropylindenyl) zirconium dichloride, (1,1'-ethylene)(2,2'-ethylene)-bis(5,6-dimethylindenyl)zirconium dichloride, (1,2'-ethylene)(2,1'-ethylene)-bis(5,6-dimethylindenyl)zirconium dichloride, (1,1'-ethylene)(2,2'-ethylene)-bis(4,7-diisopropylindenyl) zirconium dichloride, (1,2'-ethylene)(2,1'-ethylene)-bis(4,7-diisopropylindenyl) zirconium dichloride, (1,1'-ethylene)(2,2'-ethylene)-bis(4-phenylindenyl)-zirconium dichloride, (1,2'-ethylene)(2,1'-ethylene)-bis(4-phenylindenyl) zirconium dichloride, (1,1'-ethylene)(2,2'-ethylene)-bis(3-methyl-4-isopropylindenyl)zirconium dichloride, (1,2'-ethylene)(2,1'-ethylene)-bis(3-methyl-4-isopropylindenyl) zirconium dichloride, (1,1'-ethylene)(2,2'-ethylene)-bis(5,6-benzoindenyl)-zirconium dichloride, (1,2'-ethylene)(2,1'-ethylene)-bis(5,6-benzoindenyl)zirconium dichloride, (1,1'-ethylene)(2,2'-isopropylidene)-bis(indenyl)-zirconium dichloride, (1,2'-ethylene)(2,1'-isopropylidene)-bis(indenyl) zirconium dichloride, (1,1'-isopropylidene)(2,2'-ethylene)-bis(indenyl)-zirconium dichloride, (1,2'-methylene)(2,1'-ethylene)-bis(indenyl)zirconium dichloride, (1,1'-methylene)(2,2'-ethylene)-bis(indenyl)zirconium dichloride, (1,1'-ethylene)(2,2'-methylene)-bis(indenyl) zirconium dichloride, (1,1'-methylene)(2,2'-isopropylidene)-bis(indenyl)zirconium dichloride, (1,2'-methylene)(2,1'-isopropylidene)-bis(indenyl)-zirconium dichloride, (1,1'-isopropylidene)(2,2'-methylene)-bis(indenyl)zirconium dichloride, (1,1'-methylene)(2,2'-methylene) (3-methylcyclopentadienyl)(cyclopentadienyl) zirconium dichloride, (1,1'-isopropylidene)(2,2'-isopropylidene)(3-methylcyclopentadienyl) (cyclopentadienyl)zirconium dichloride, (1,1'-propylidene) (2,2'-propylidene)(3-methylcyclopentadienyl) (cyclopentadienyl)zirconium dichloride, (1,1'-ethylene)(2,2'-methylene)-bis(3-methylcyclopentadienyl)zirconium dichloride, (1,1'-methylene)(2,2'-ethylene)-bis(3-methylcyclopentadienyl)zirconium dichloride, (1,1'-isopropylidene)(2,2'-ethylene)-bis(3-methylcyclopentadienyl)zirconium dichloride, (1,1'-ethylene)(2,2'-isopropylidene)-bis(3-methylcyclopentadienyl)zirconium dichloride, (1,1'-methylene)(2,2'-methylene)-bis(3-methylcyclopentadienyl) zirconium dichloride, (1,1'-methylene)(2,2'-isopropylidene)-bis(3-methylcyclopentadienyl)zirconium dichloride, (1,1'-isopropylidene)(2,2'-isopropylidene)-bis(3-methylcyclopentadienyl)zirconium dichloride, (1,1'-ethylene)(2,2'-methylene)-bis(3,4-dimethylcyclopentadienyl)zirconium dichloride, (1,1'-ethylene)(2,2'-isopropylidene)-bis(3,4-dimethylcyclopentadienyl)zirconium dichloride, (1,1'-methylene)(2,2'-ethylene)-bis(3,4-dimethylcyclopentadienyl)zirconium dichloride, (1,1'-methylene)(2,2'-isopropylidene)-bis(3,4-dimethylcyclopentadienyl)zirconium dichloride, (1,1'-isopropylidene)(2,2'-isopropylidene)-bis(3,4-dimethylcyclopentadienyl)zirconium dichloride, (1,2'-ethylene)(2,1'-methylene)-bis(3-methylcyclopentadienyl) zirconium dichloride, (1,2'-ethylene)(2,1'-isopropylidene)-bis (3-methylcyclopentadienyl)zirconium dichloride, (1,2'-methylene)(2,1'-methylene)-bis(3-methylcyclopentadienyl) zirconium dichloride, (1,2'-methylene)(2,1'-isopropylidene)-bis(3-methylcyclopentadienyl)zirconium dichloride, (1,2'-isopropylidene)(2,1'-isopropylidene)-bis (3-methylcyclopentadienyl)zirconium dichloride, (1,2'-ethylene)(2,1'-methylene)-bis(3,4-dimethylcyclopentadienyl)zirconium dichloride, (1,2'-ethylene)(2,1'-isopropylidene)-bis(3,4-dimethylcyclopentadienyl)zirconium dichloride, (1,2'-methylene)(2,1'-methylene)-bis (3,4-dimethylcyclopentadienyl)zirconium dichloride, (1,2'-methylene)(2,1'-isopropylidene)-bis(3,4-dimethylcyclopentadienyl)zirconium dichloride, (1,2'-isopropylidene)(2,1'-isopropylidene)-bis(3,4-dimethylcyclopentadienyl)zirconium dichloride and compounds obtained by substituting zirconium contained in these compounds with titanium or hafnium. The (A-2) components may be used in combination of tow or more kinds thereof.

(A-3) Höchst and BASF Type Complexes and Transition Metal Compound Having an Azulenyl Skeleton They are transition metal compounds represented by the Formula (3):

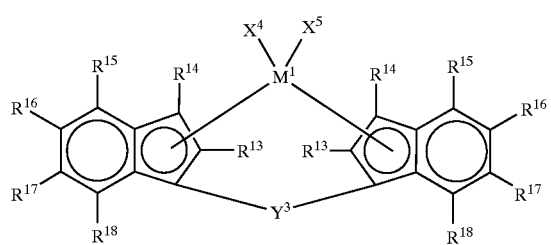

(3)

wherein $M^1$ represents titanium, zirconium or hafnium; $R^{13}$ to $R^{18}$ each represent independently a hydrogen atom, a halogen atom, a hydrocarbon group having 1 to 20 carbon atoms or a halogen-containing hydrocarbon group having 1 to 20 carbon atoms; at least one pair of $R^{15}$ and $R^{16}$ $R^{16}$ and $R^{17}$ and $R^{18}$ may be combined with each other to form a ring; $X^4$ and $X^5$ each represent independently a hydrogen atom, a halogen atom or a hydrocarbon group having 1 to 20 carbon atoms; $Y^3$ is a divalent cross-linking group combining two ligands and represents a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —NR$^{12}$—, —PR$^{12}$—, —P(O)R$^{12}$—, —BR$^{12}$— or —AlR$^{12}$—; and $R^{12}$ represents a hydrogen atom, a halogen atom, a hydrocarbon group having 1 to 20 carbon atoms or a halogen-containing hydrocarbon group having 1 to 20 carbon atoms. In Formula (3) described above, the transition metal compound in which at least one pair of $R^{15}$ and $R^{16}$, $R^{16}$ and $R^{17}$ and $R^{17}$ and $R^{18}$ form a ring is a compound which known as a BASF type complex.

In Formula (3) described above, the halogen atom represented by $R^{13}$ to $R^{18}$ includes a chlorine atom, a bromine atom, a fluorine atom and an iodine atom. The hydrocarbon group having 1 to 20 carbon atoms includes, for example, alkyl groups such as methyl, ethyl, n-propyl, isopropyl, n-butyl, isobutyl, tert-butyl, n-hexyl and n-decyl, aryl groups such as phenyl, 1-naphthyl and 2-naphthyl and aralkyl groups such as benzyl. The halogen-containing hydrocarbon group having 1 to 20 carbon atoms includes groups in which at least one hydrogen atom contained in the hydrocarbon groups described above is substituted with a suitable halogen atom. These $R^{13}$ to $R^{18}$ may be the same as or different from each other. The adjacent groups, that is, at least one pair of $R^{15}$ and $R^{16}$, $R^{16}$ and $R^{17}$ and $R^{17}$ and $R^{18}$ has to be combined with each other to form a ring. An indenyl group obtained by such ring formation includes, for example, 4,5-benzoindenyl, α-acenaphthoindenyl and compounds substituted with alkyl having 1 to 10 carbon atoms.

The halogen atom represented by $X^4$ and $X^5$ includes a chlorine atom, a bromine atom, a fluorine atom and an iodine atom. The hydrocarbon group having 1 to 20 carbon atoms includes, for example, alkyl groups such as methyl, ethyl, propyl, isopropyl, n-butyl, tert-butyl and n-hexyl, aryl groups such as phenyl and aralkyl groups such as benzyl. $X^4$ and $X^5$ may be the same as or different from each other. On the other hand, $Y^3$ is a divalent cross-linking group combining two ligands, and the divalent hydrocarbon group having 1 to 20 carbon atoms represented thereby includes, for example, alkylene groups such as methylene, dimethylene, 1,2-ethylene, dimethyl-1,2-ethylene, 1,4-tetramethylene and 1,2-cyclopropylene and arylalkylene groups such as diphenylmethylene. The divalent halogen-containing hydrocarbon group having 1 to 20 carbon atoms includes, for example, chloroethylene and chloromethylene. The divalent silicon-containing group includes, for example, methylsilylene, dimethylsilylene, diethylsilylene, diphenylsilylene and methylphenylsilylene. Further, groups obtained by substituting silicon contained in the silicon-containing groups described above with germanium and tin can be given as the germanium-containing group and the tin-containing group. Two ligands combined with $Y^3$ are usually the same but may be different in some cases.

The transition metal compound represented by Formula (3) described above includes, for example, compounds described in Japanese Patent Application Laid-Open No. 184179/1994 and Japanese Patent Application Laid-Open No. 345809/1994. The specific examples thereof include benzoindenyl type or acenaphthoindenyl type compounds such as rac-dimethylsilanediyl-bis-1-(2-methyl-4,5-benzoindenyl)-zirconium dichloride, rac-phenylmethylsilanediyl-bis-1-(2-methyl-4,5-benzoindenyl)-zirconium dichloride, rac-ethanediyl-bis-1-(2-methyl-4,5-benzoindenyl)-zirconium dichloride, rac-butanediyl-bis-1-(2-methyl-4,5-benzoindenyl)-zirconium dichloride, rac-dimethylsilanediyl-bis-1-(4,5-benzoindenyl)-zirconium dichloride, rac-dimethylsilanediyl-bis-1-(2-methyl-α-methyl-α-acenaphthoindenyl)-zirconium dichloride and rac-phenylmethylsilanediyl-bis-1-(2-methyl-α-acenaphthoindenyl)-zirconium dichloride, and compounds obtained by substituting zirconium contained in these compounds with titanium or hafnium.

In Formula (3) described above, capable of being used as well are the transition metal compounds having an indenyl skeleton in which any pair of $R^{15}$ and $R^{16}$, $R^{16}$ and $R^{17}$ and $R^{17}$ and $R^{18}$ does not form a ring or the transition metal compounds having a 4,5,6,7-tetrahydroindenyl skeleton which correspond thereto. These transition metal compounds are known as a Höchst type complex. Capable of being given as these transition metal compounds are, for example, compounds described in Japanese Patent Application Laid-Open No. 268308/1992, ditto 306304/1993, ditto 100579/1994, ditto 157661/1994, ditto 149815/1995, ditto 188318/1995 and ditto 258321/1995.

The specific examples thereof include aryl-substituted compounds such as dimethylsilanediyl-bis-1-(2-methyl-4-phenylindenyl)-zirconium dichloride, dimethylsilanediyl-bis-1-[2-methyl-4-(1-naphthyl)indenyl]-zirconium dichloride, dimethylsilanediyl-bis-1-(2-ethyl-4-phenylindenyl)-zirconium dichloride, dimethylsilanediyl-bis-1-[2-ethyl-4-(1-naphthyl)indenyl]-zirconium dichloride, phenylmethylsilanediyl-bis-1-(2-methyl-4-phenylindenyl)-zirconium dichloride, phenylmethylsilanediyl-bis-1-[2-methyl-4-(1-naphthyl)indenyl]-zirconium dichloride, phenylmethylsilanediyl-bis-1-(2-ethyl-4-phenylindenyl)-zirconium dichloride and phenylmethylsilanediyl-bis-1-[2-ethyl-4-(1-naphthyl)indenyl]-zirconium dichloride; 2,4-position-substituted compounds such as rac-dimethylsilylene-bis-1-(2-methyl-4-ethylindenyl)-zirconium dichloride, rac-dimethylsilylene-bis-1-(2-methyl-4-isopropylindenyl)-zirconium dichloride, rac-dimethylsilylene-bis-1-(2-methyl-4-ter-butylindenyl)-zirconium dichloride, rac-phenylmethylsilylene-bis-1-(2-methyl-4-isopropylindenyl)-zirconium dichloride, rac-dimethylsilylene-bis-1-(2-ethyl-4-methylindenyl)-zirconium dichloride, rac-dimethylsilylene-bis-1-(2,4-dimethylindenyl)-zirconium dichloride and rac-dimethylsilylene-bis-1-(2-methyl-4-ethylindenyl)-zirconium dimethyl; 4,7-position, 2,4,7-position or 3,4,7-position-substituted compounds such as rac-dimethylsilylene-bis-1-(4,7-dimethylindenyl)-zirconium dichloride, rac-1,2-ethanediyl-bis-1-(2-methyl-4,7-dimethylindenyl)-zirconium dichloride, rac-dimethylsilylene-bis-1-(3,4,7-trimethylindenyl)-zirconium dichloride, rac-1,2-ethanediyl-bis-1-(4,7-dimethylindenyl)-zirconium dichloride and rac-1,2-butanediyl-bis-1-(4,7-dimethylindenyl)-zirconium dichloride; 2,4,6-position-substituted compounds such as dimethylsilanediyl-bis-1-(2-methyl-4,6-diisopropylindenyl)-zirconium dichloride, phenylmethylsilanediyl-bis-1-(2-methyl-4,6-diisopropylindenyl)-zirconium dichloride, rac-dimethylsilanediyl-bis-1-(2-methyl-4,6-diisopropylindenyl)-zirconium dichloride, rac-1,2-ethanediyl-bis-1-(2-methyl-4,6-diisopropylindenyl)-zirconium dichloride, rac-diphenylsilanediyl-bis-1-(2-methyl-4,6-diisopropylindenyl)-zirconium dichloride, rac-phenylmethylsilanediyl-bis-1-(2-methyl-4,6-diisopropylindenyl)-zirconium dichloride and rac-dimethylsilanediyl-bis-1-(2,4,6-trimethylindenyl)-zirconium dichloride; 2,5,6-position-substituted compounds such as rac-dimethylsilanediyl-bis-1-(2,5,6-trimethylindenyl)-zirconium dichloride; 4,5,6,7-tetrahydroindenyl compounds such as rac-dimethylsilylene-bis-(2-methyl-4,5,6,7-tetrahydro-1-indenyl)-zirconium dichloride, rac-ethylene-bis-(2-methyl-4,5,6,7-tetrahydro-1-indenyl)-zirconium dichloride, rac-dimethylsilylene-bis-(2-methyl-4,5,6,7-tetrahydro-1-indenyl)-zirconium dimethyl, rac-ethylene-bis-(2-methyl-4,5,6,7-tetrahydro-1-indenyl)-zirconium dimethyl and rac-ethylene-bis-(4,7-dimethyl-4,5,6,7-tetrahydro-1-indenyl)-zirconium dichloride; and compounds obtained by substituting zirconium contained in these compounds with titanium or hafnium. The (A-3) Components May Be Used in Combination of Two or More Kinds Thereof.

Further, compounds described in Japanese Patent Application Laid-Open No. 226712/1998 can be given as the transition metal compound having an azulenyl skeleton. They are, for example, methylenebis{1,1'-(2-methyl-4-phenyl-1,4-dihydroazulenyl)}zirconium dichloride and dimethylsilylenebis{1,1'-(2-methyl-4-phenyl-1,4-dihydroazulenyl)}zirconium dichloride.

(A-4) Substituted Cp Type Complex

It is a transition metal compound represented by the following Formula (4):

$$(R^{19}{}_5C_5)_m M^1 X^1{}_{4-m} \qquad (4)$$

wherein $M^1$ represents titanium, zirconium or hafnium; $R^{19}{}_5C_5$ represents a hydrocarbon group-substituted cyclopentadienyl group; $X^1$ represents a hydrogen atom, a halogen atom or a hydrocarbon group having 1 to 20 carbon atoms; m represents an integer of 2 to 4; five $R^{19}$'s may be the same or different; m groups of $R^{19}{}_5C_5$ may be the same or different; and (4–m) groups of $X^1$ may be the same or different.

In the compound (A) used in the present invention, the hydrocarbon group represented by $R^{19}$ or $X^1$ in Formula (4) described above shall not specifically be restricted, and capable of being preferably given are, for example, an alkyl group having 1 to 20 carbon atoms, an aryl group, an arylalkyl group and an alkylaryl group. In this respect, capable of being given as the alkyl group having 1 to 20 carbon atoms are, for example, methyl, ethyl, propyl, isopropyl, butyl, isobutyl, t-butyl, amyl, hexyl, heptyl, octyl, nonyl, capryl, undecyl, lauryl, tridecyl, myristyl, pentadecyl, cetyl, heptadecy, stearyl, nonadecyl and eicosyl. For example, phenyl, benzyl and phenethyl can be given as the aryl group having 6 to 20 carbon atoms and arylalkyl group. For example, p-tolyl and p-n-butylphenyl can be given as the alkylaryl group having 7 to 20 carbon atoms. In Formula (4) described above, m is particularly preferably 2.

To be specific, capable of being suitably used as the compound represented by Formula (4) are, for example, [(CH$_3$)$_5$C$_5$]$_2$Hf(CH$_2$Ph)$_2$, [(CH$_3$)$_5$C$_5$]$_2$Zr(CH$_2$Ph)$_2$, [(CH$_3$)$_5$C$_6$]$_2$Hf(C$_6$H$_4$-p-CH$_3$)$_2$, [(CH$_3$)$_5$C$_5$]$_2$Zr(C$_6$H$_4$-p-CH$_3$)$_2$, [(CH$_3$)$_5$C$_5$]$_2$Hf(CH$_3$)$_2$, [(CH$_3$)$_5$C$_5$]$_2$Zr(CH$_3$)$_2$, [(C$_2$H$_5$)$_5$C$_5$]$_2$Hf(CH$_3$)$_2$, [(C$_2$H$_5$)$_5$C$_5$]$_2$Zr(CH$_3$)$_2$, [(n-C-$_3$H$_7$)$_5$C$_5$]$_2$Hf(CH$_3$)$_2$, [(n-C-$_3$H$_7$)$_5$C$_5$]$_2$Zr(CH$_3$)$_2$, [(CH$_3$)$_5$C$_5$]$_2$HfH(CH$_3$), [(CH$_3$)$_5$C$_5$]$_2$ZrH(CH$_3$), [(C$_2$H$_5$)$_5$C$_5$]$_2$HfH(CH$_3$), [(C$_2$H$_5$)$_5$C$_5$]$_2$ZrH(CH$_3$) [(C$_3$H$_7$)$_5$C$_5$]$_2$HfH(CH$_3$), [(C$_3$H$_7$)$_5$C$_5$]$_2$ZrH(CH$_3$), [(CH$_3$)$_5$C$_5$]$_2$Hf(H)$_2$, [(CH$_3$)$_5$C$_5$]$_2$Zr(H)$_2$, [(C$_2$H$_5$)(CH$_3$)$_4$C$_5$]$_2$Hf(CH$_3$)$_2$, [(C$_2$H$_5$)(CH$_3$)$_4$C$_5$]$_2$Zr(CH$_3$)$_2$, [(n-C-$_3$H$_7$)(CH$_3$)$_4$C$_5$]$_2$Hf(CH$_3$)$_2$, [(n-C-$_3$H$_7$)(CH$_3$)$_4$C$_5$]$_2$Zr(CH$_3$)$_2$, [(n-C-$_4$H$_9$)(CH$_3$)$_4$C$_5$]$_2$Hf(CH$_3$)$_2$, [(n-C-$_4$H$_9$)(CH$_3$)$_4$C$_5$]$_2$Zr(CH$_3$)$_2$, [(CH$_3$)$_5$C$_5$]$_2$HfCl$_2$, [(CH$_3$)$_5$C$_5$]$_2$ZrCl$_2$, [(CH$_3$)$_5$C$_5$]$_2$HfH(Cl) and [(CH$_3$)$_5$C$_5$]$_2$ZrH(Cl). Among them, preferred are the pentaalkylcyclopentadienyl compounds such as [(CH$_3$)$_5$C$_5$]$_2$Hf(CH$_2$Ph)$_2$, [(CH$_3$)$_5$C$_5$]$_2$Zr(CH$_2$Ph)$_2$, [(CH$_3$)$_5$C$_5$]$_2$Hf(CH$_3$)$_2$, [(CH$_3$)$_5$C$_5$]$_2$Zr(CH$_3$)$_2$, [(CH$_3$)$_5$C$_5$]$_2$HfH(CH$_3$), [(CH$_3$)$_5$C$_5$]$_2$ZrH(CH$_3$), [(CH$_3$)$_5$C$_5$]$_2$Hf(H)$_2$, [(CH$_3$)$_5$C$_5$]$_2$Zr(H)$_2$, [(C$_2$H$_5$)(CH$_3$)$_4$C$_5$]$_2$Hf(CH$_3$)$_2$, [(C$_2$H$_5$)(CH$_3$)$_4$C$_5$]$_2$Zr(CH$_3$)$_2$, [(n-C-$_3$H$_7$)(CH$_3$)$_4$C$_5$]$_2$Hf(CH$_3$)$_2$, [(n-C-$_3$H$_7$)(CH$_3$)$_4$C$_5$]$_2$Zr(CH$_3$)$_2$, [(n-C-$_4$H$_9$) (CH$_3$)$_4$C$_5$]$_2$Hf(CH$_3$)$_2$, [(n-C-$_4$H$_9$)(CH$_3$)$_4$C$_5$]$_2$Zr(CH$_3$)$_2$, [(CH$_3$)$_5$C$_5$]$_2$ZrCl$_2$, [(CH$_3$)$_5$C$_5$]$_2$ZrHCl, [(CH$_3$)$_5$C$_5$]$_2$HfCl$_2$ and [(CH$_3$)$_5$C$_5$]$_2$HfHCl. In particular, the hafnium compounds and the zirconium compounds are preferred. The (A-4) components may be used in combination of two or more kinds thereof.

(A-5) Bis Cp Type Complex

It is a transition metal compound represented by the following Formula (5):

$$Cp_2 M^1 R^{20}{}_a R^{21}{}_b \qquad (5)$$

wherein $M^1$ represents a transition metal of the fourth group in the periodic table; Cp represents a cyclic unsaturated hydrocarbon group such as a cyclopentadienyl group, a substituted cyclopentadienyl group, an indenyl group, a substituted indenyl group, a tetrahydroindenyl group, a substituted tetrahydroindenyl group, a fluorenyl group and a substituted fluorenyl group or a linear unsaturated hydrocarbon group; $R^{20}$ and $R^{21}$ each represent independently a ligand such as a σ bonding ligand, a chelating ligand and a Lewis base, and $R^{20}$ and $R^{21}$ may be combined with each other to form a ring; a and b each represent independently an integer of 0 to 2; the substituted cyclopentadienyl group has a substitution number of 1 to 5, and the number and the kind of substituents on two cyclopentadienyl groups may be the same or different, provided that when one cyclopentadienyl group has a substitution number of 5, the other cyclopentadienyl group has a substitution number of 1 to 4. In Formula (5) described above, $M^1$ represents a transition metal of the fourth group in the periodic table and includes titanium, zirconium or hafnium. Cp represents a cyclic unsaturated hydrocarbon group such as a cyclopentadienyl group, a substituted cyclopentadienyl group, an indenyl group, a substituted indenyl group, a tetrahydroindenyl group, a substituted tetrahydroindenyl group, a fluorenyl group and a substituted fluorenyl group or a linear unsaturated hydrocarbon group. $R^{20}$ and $R^{21}$ each represent independently a ligand such as a σ bonding ligand, a chelating ligand and a Lewis base. To be specific, capable being given as the example of the σ bonding ligand are a hydrogen atom, an oxygen atom, a halogen atom, an alkyl group having 1 to 20 carbon atoms, an alkoxy group having 1 to 20 carbon atoms, an aryl group, alkylaryl group or arylalkyl group having 6 to 20 carbon atoms, an acyloxy group having 1 to 20 carbon atoms, an allyl group, a substituted allyl group and a substituent having a silicon atom. Also, an acetylacetonate group and a substituted acetylacetonate group can be given as the chelating ligand. $R^{20}$ and $R^{21}$ may be combined with each other to form a ring. a and b each represent independently an integer of 0 to 2. The substituted cyclopentadienyl group has a substitution number of 1 to 5, and the number and the kind of substituents on two cyclopentadienyl groups may be the same or different, provided that when one cyclopentadienyl group has a substitution number of 5, the other cyclopentadienyl group has a substitution number of 1 to 4. The substituent shall not specifically be restricted and includes, for example, the same ones as those for $R^{19}$ shown in the transition metal of the fourth group in the periodic table represented by Formula (4) described above.

When Cp described above has a substituent, the above substituent is preferably an alkyl group having 1 to 20 carbon atoms. Two Cp's may be the same as or different from each other. The substituted cyclopentadienyl group in Formula (5) described above includes, for example, methylcyclopentadienyl, ethylcyclopentadienyl; isopropylcyclopentadienyl; 1,2-dimethylcyclopentadienyl; tetramethyl-cyclopentadienyl; 1,3-dimethylcyclopentadienyl; 1,2,3-trimethylcyclopentadienyl; 1,2,4-trimethyl-cyclopentadienyl; pentamethylcyclopentadienyl; and trimethylsilylcyclopentadienyl. The specific examples of $R^{20}$ and $R^{21}$ in Formula (5) described above include, for example, a fluorine atom, a chlorine atom, a bromine atom and an iodine atom as the halogen atom, methyl, ethyl, n-propyl, isopropyl, n-butyl, octyl and 2-ethylhexyl as the alkyl group having 1 to 20 carbon atoms, methoxy, ethoxy, propoxy and butoxy as the alkoxy group having 1 to 20 carbon atoms, phenoxy, phenyl, tolyl, xylyl and benzyl as the aryl group, alkylaryl group or arylalkyl group having 6 to 20 carbon atoms, heptadecycarbonyloxy as the acyloxy group having 1 to 20 carbon atoms and trimethylsilyl and (trimethylsilyl)methyl as the substituent having a silicon atom.

The compound represented by Formula (5) described above includes, for example, bis(cyclopentdienyl) dimetylzirconium, bis(cyclopentdienyl)diphenylzirconium, bis(cyclopentdienyl)dietylzirconium, bis(cyclopentdienyl) dibenzylzirconium, bis(cyclopentdienyl) dimethoxyzirconium, bis(cyclopentdienyl) dichlorozirconium, bis(cyclopentdienyl) dihydridezirconium, bis(cyclopentdienyl) monochlomonohydridezirconium, bis(methylcyclopentdienyl)dimetylzirconium, bis(methylcyclopentdienyl)dichlorozirconium, bis(methylcyclopentdienyl)dibenzylzirconium, (cyclopentdienyl)(pentamethylcyclopentdienyl)-dichlorozirconium and compounds obtained by substituting zirconium contained in these compounds with titanium or hafnium. The (A-5) components may be used in combination of two or more kinds thereof.

(A-6) Mono Cp Type Complex

It is a transition metal compound represented by the Formula (6):

$$CpM^1R^{20}{}_aR^{21}{}_bR^{22}{}_c \qquad (6)$$

wherein $M^1$ represents a transition metal of the fourth group in the periodic table; Cp represents a cyclic unsaturated hydrocarbon group such as a cyclopentadienyl group, a substituted cyclopentadienyl group, an indenyl group, a substituted indenyl group, a tetrahydroindenyl group, a substituted tetrahydroindenyl group, a fluorenyl group and a substituted fluorenyl group or a linear unsaturated hydrocarbon group; $R^{20}$, $R^{21}$ and $R^{22}$ each represent independently a ligand such as a σ bonding ligand, a chelating ligand and a Lewis base, and two or more of $R^{20}$, $R^{21}$ and $R^{22}$ may be combined with each other to form a ring; and a, b and c each represent independently an integer of 0 to 2. $M^1$, Cp, $R^{20}$, $R^{21}$, $R^{22}$, a and b are the same as those explained in Formula (5) described above. $R^{22}$ represents, as is the case with $R^{20}$ and $R^{21}$, a ligand such as a σ bonding ligand, a chelating ligand and a Lewis base, and the specific examples thereof include the same specific examples of $R^{20}$ and $R^{21}$ The compound represented by Formula (6) described above includes, for example, (pentamethylcyclopentdienyl) trimetylzirconium, (pentamethylcyclopentdienyl) triphenylzirconium, (pentamethylcyclopentdienyl) tribenzylzirconium, (pentamethylcyclopentdienyl) trichlorozirconium, (pentamethylcyclopentdienyl) trimethoxyzirconium, (cyclopentdienyl)trimetylzirconium, (cyclopentdienyl)triphenylzirconium, (cyclopentdienyl) tribenzylzirconium, (cyclopentdienyl)trichlorozirconium, (cyclopentdienyl)trimethoxyzirconium, (cyclopentdienyl) dimethyl(methoxy)zirconium, (methylcyclopentdienyl) trimethylzirconium, (methylcyclopentdienyl) triphenylzirconium, (methylcyclopentdienyl) tribenzylzirconium, (methylcyclopentdienyl) trichlorozirconium, (methylcyclopentdienyl)dimethyl (methoxy)zirconium, (dimethylcyclopentdienyl) trichlorozirconium, (trimethylcyclopentdienyl) trichlorozirconium, (trimethylcyclopentdienyl) trimethylzirconium, (tetramethylcyclopentdienyl) trichlorozirconium, (pentamethylcyclopentdienyl) trichlorozirconium and compounds obtained by substituting zirconium contained in these compounds with titanium or hafnium. The (A-6) components may be used in combination of two or more kinds thereof.

(A-7) Constrained Geometry Complex

It is a transition metal compound represented by the following Formula (7):

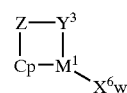

(7)

wherein $M^1$ represents titanium, zirconium or hafnium; Cp represents a cyclic unsaturated hydrocarbon group such as a cyclopentadienyl group, a substituted cyclopentadienyl group, an indenyl group, a substituted indenyl group, a tetrahydroindenyl group, a substituted tetrahydroindenyl group, a fluorenyl group and a substituted fluorenyl group or a linear unsaturated hydrocarbon group; $X^6$ represents a hydrogen atom, a halogen atom, an alkyl group having 1 to 20 carbon atoms, an aryl group, alkylaryl group or arylalkyl group having 6 to 20 carbon atoms or an alkoxy group having 1 to 20 carbon atoms; Z represents $SiR^{23}$, $CR^{23}{}_2$, $SiR^{23}{}_2SiR^{23}{}_2$, $CR^{23}{}_2CR^{23}{}_2$, $CR^{23}{}_2CR^{23}{}_2CR^{23}{}_2$, $CR^{23}=CR^{23}$, $CR^{23}{}_2SiR^{23}{}_2$ or $GeR^{23}{}_2$; $Y^3$ represents —N($R^{24}$)—, —O—, —S— or —P($R^{24}$)—; $R^{23}$ described above is a hydrogen atom or a group selected from alkyl having up to 20 non-hydrogen atoms, aryl, silyl, halogenated alkyl, halogenated aryl and combination thereof; $R^{24}$ is an alkyl group having 1 to 10 carbon atoms or an aryl group having 6 to 10 carbon atoms or may form a bonding ring system having up to 30 non-hydrogen atoms with at least one $R^{23}$; and w represents 1 or 2.

The specific examples of the compound represented by Formula (7) described above includes (tertiary butylamide) (tetramethyl-η⁵-cyclopentadienyl)-1,2-ethanediylzirconium dichloride: (tertiary butylamide) (tetramethyl-η⁵-cyclopentadienyl)-1,2-ethanediyltitanium dichloride; (methylamide)(tetramethyl-η⁵-cyclopentadienyl)-1,2-ethanediylzirconium dichloride: (methylamide)-(tetramethyl-η⁵-cyclopentadienyl)-1,2-ethanediyltitanium dichloride; (ethylamide)-(tetramethyl-η⁵-cyclopentadienyl)-methylenetitanium dichloride: (tertiary butylamide) dimethyl (tetramethyl-η⁵-cyclopentadienyl) silanetitanium dichloride: (tertiary butylamide)dimethyl (tetramethyl-η⁵-cyclopentadienyl)silanezirconium dibenzyl; (benzylamide)dimethyl-(tetramethyl-η⁵-cyclopentadienyl)silanetitanium dichloride; and (phenylphosphide)dimethyl(tetramethyl-η⁵-cyclopentadienyl) silanezirconium dibenzyl. The (A-7) components may be used in combination of two or more kinds thereof.

The suitable examples of the combination of the (A-7) components include Hochst type zirconium complex-Höchst type hafnium complex, BASF type zirconium complex-BASF type hafnium complex, Hochst type zirconium complex-BASF type hafnium complex, BASF type zirconium complex-Hochst type hafnium complex, BASF type zirconium complex-double cross-linking type hafnium complex, Höchst type zirconium complex-double cross-linking type hafnium complex, double cross-linking type zirconium complex-double cross-linking type hafnium complex, double cross-linking type zirconium complex-BASF type hafnium complex, double cross-linking type zirconium complex-Höchst type hafnium complex, heterogeneous cross-linking type zirconium complex-heterogeneous cross-linking type hafnium complex, heterogeneous cross-linking type zirconium complex-BASF type hafnium complex, heterogeneous cross-linking type zirconium complex-double cross-linking type hafnium complex, heterogeneous cross-linking type zirconium complex-Höchst type zirconium complex, heterogeneous cross-linking type hafnium complex-BASF type zirconium complex, heterogeneous cross-linking type hafnium complex-double cross-linking type zirconium complex and heterogeneous cross-linking type hafnium complex-Höchst type zirconium complex. The examples of the particularly preferred combination include heterogeneous cross-linking type zirconium complex-double cross-linking type hafnium complex and heterogeneous cross-linking type hafnium complex-double cross-linking type zirconium complex.

Further, capable of being given are combination comprising zirconium complexes having an azulenyl skeleton and hafnium complexes having an azulenyl skeleton, combination comprising hafnium complexes having an azulenyl skeleton and one of the zirconium complexes of (A-1), (A-2), the BASF type complexes, the Höchst type complexes, (A-4), (A-5), (A-6) and (A-7), combination comprising zirconium complexes having an azulenyl skeleton and one of the hafnium complexes of (A-1), (A-2), the BASF type complexes, the Höchst type complexes, (A-4), (A-5) and (A-6) and combination comprising zirconium complexes having an azulenyl skeleton and the titanium complexes of (A-7).

The (B-1) component includes methylaluminoxane, ethylaluminoxane, isobutylamluinoxane and copolymerized amluinoxanes (methyl-ethylaluminoxane, methyl-isobutylaluminoxane and the like) produced from mixed trialkylaluminums. The (B-2) component includes tetrakis (pentafluorophenyl)boric acid N,N-dimethylanilinium, tetrakis(pentafluorophenyl)boric acid N,N-dimethylammonium, triphenylboric acid and tris (pentafluorophenyl)boric acid. In the olefin polymerization catalyst, only the (B-1) component or the (B-2) component may be used as the (B) component or the (B-1) component and the (B-2) component may be used in combination. Further, the (B) component may comprise organic aluminum such as trimethylaluminum, triethylaluminum, triisopropylaluminum and triisobutylaluminum.

Various resins such as polyolefin thermoplastic resins, copolymers of olefins and vinyl monomers, modified olefin copolymers, condensed high molecular compounds and polymers obtained by addition polymerization can be given as the examples of the thermoplastic resin blended with the propylene homopolymer or propylene copolymer of the present invention. The polyolefin thermoplastic resins include homopolymer and copolymers such as polyethylene, polypropylene, polystyrene, polybutene, ethylene/α-olefin copolymers, block polypropylene, copolymers of propylene and ethylene with α-olefins having 4 to 20 carbon atoms and high pressure low density polyethylene.

Capable of being given as the examples thereof are copolymers of olefins and vinyl monomers, modified olefin copolymers, condensed high molecular compounds and polymers obtained by addition polymerization. The copolymers of olefins and vinyl monomers include ethylene/vinyl acetate copolymers, ethylene/acrylic acid copolymers, ethylene/ethyl acrylate copolymers, ethylene/methyl methacrylate copolymers, metal ion-substituted matters of ionomer:ethylene/carboxylic acid-containing vinyl monomer copolymers (for example, sodium ion-neutralized matters of ethylene/acrylic acid copolymers) and ethylene/vinyl alcohol copolymers.

The modified olefin copolymers include maleic anhydride-modified polypropylene and maleic anhydride-modified polyethylene.

The condensed high molecular compounds include polycarbonate, polyacetal, polyamides such as nylon 6 and nylon 66, polyesters such as polyethylene terephthalate and polybutylene terephthalate, polyphenylene oxides, polysulfones, polyethersulfones, polyphenylene sulfides, polyimides and phenol resins.

The polymers obtained by addition polymerization (polymers obtained from polar vinyl monomers and diene monomers) include homopolymers such as polymethyl methacrylate, polystyrene, polyacrylonitrile, polyvinyl chloride, polybutadiene, polyisoprene and polyvinyl alcohol, acrylonitrile/butadiene/styrene copolymers, SEBS which is a hydrogenated polymer, acrylonitrile/styrene copolymers and high impact polystyrene (rubber-modified). In addition thereto, petroleum resins and thermoplastic elastomers are included therein.

Among them, the preferred thermoplastic resin blended with the propylene homopolymer or propylene copolymer of the present invention is a polyolefin thermoplastic resin, and it is more preferably polypropylene, polyethylene, copolymers of propylene/ethylene with α-olefins having 4 to 20 carbon atoms and block polypropylene, most preferably polypropylene, copolymers of propylene/ethylene with α-olefins having 4 to 20 carbon atoms and block polypropylene.

A blending amount of the propylene homopolymer or the propylene copolymer in the thermoplastic resin of the present invention is 1 to 90% by weight, preferably 2 to 90% by weight, more preferably 4 to 90% by weight and most preferably 6 to 90% by weight. If the blending amount of the propylene homopolymer or the propylene copolymer is less than 1% by weight in the thermoplastic resin of the present invention, the effect of improving a moldability of the composition is likely to be unsatisfactory. On the other hand, if it exceeds 90% by weight, the characteristics of the thermoplastic resin constituting the other composition are damaged in a certain case.

Additives used in the thermoplastic resin composition of the present invention include antioxidants, hydrochloric acid absorbers, light stabilizers, lubricants, nucleating agents, inorganic fillers, stabilizers and UV absorbers. Phenol antioxidants, sulfur antioxidants and phosphorus antioxidants can be used as the antioxidants. Among these additives, the antioxidant, the hydrochloric acid absorber, the light stabilizer, the lubricant, the stabilizer and the UV absorber are preferably added in an amount of 0.0001 to 10% by weight based on the composition. The nucleating agent is added in an amount of 0.001 to 10% by weight, preferably 0.01 to 5% by weight and particularly preferably 0.1 to 3% by weight based on the composition. The inorganic filler is added in an amount of 0.1 to 60% by weight, preferably 0.3 to 50% by weight and particularly preferably 1 to 40% by weight based on the composition.

The propylene homopolymer, the propylene copolymer or the thermoplastic resin composition of the present invention can be provided with a two-dimensional form by a dice and molded by a molding method including a melt-extruding step. The molded article includes a sheet, a film, a blow molded article, a fiber and an extrusion-foamed article, and preferred are a sheet, a blow molded article and an extrusion-foamed article.

EXAMPLES

Next, the present invention shall be explained in further details with reference to examples, but the present invention shall by no means be restricted by these examples.

First, evaluation methods for the propylene homopolymer and the propylene copolymer shall be explained.

(1) Measurement of Melt Tension (MT)

Measured on the following conditions by means of the following apparatus.

Apparatus: Capillograph IB manufactured by Toyo Seiki Co., Ltd.

Capillary: diameter 2.095 mm, length 8.0 mm

Cylinder diameter: 9.6 mm

Cylinder extruding speed: 10 mm/minute

Winding speed: 3.14 m/minute

Temperature: 230° C.

Sample: added as an antioxidant was 4000 weight ppm of a mixture of Iruganox 1010 (manufactured by Ciba Specialty Chemicals Co., Ltd.) and BHT in a weight ratio 1:1

(2) Measurement of Z Average Molecular Weight (Mz) and Molecular Weight Distribution Mw/Mn The Z average molecular weight (Mz) in terms of polyethylene and the molecular weight distribution Mw/Mn were measured by a GPC method on the following conditions by means of the following apparatus.

Apparatus body: Waters ALC/CPC 150C column: GMHHR-H(S) HT two columns, manufactured by Toso Co., Ltd.

Conditions temperature: 145° C.

solvent: 1,2,4-trichlorobenzene flow rate: 1.0 ml/minute sample concentration: 2.2 mg/ml charge amount: 160 microliter calibration curve: Universal Calibration detector: RI (Waters 150C)

analytical program: HT-GPC (Ver. 1.0)

(3) Measurement of Melt Index (MI)

Measured on the following conditions based on ASTM D1238:

Measuring temperature: 230° C.

Load: 2.16 kg (21.2N)

Sample: added as an antioxidant was 4000 weight ppm of a mixture of Iruganox 1010 and BHT in a weight ratio 1:1

(4) Measurement of Programmed Temperature Fractional Chromatograph (TREF)

Calculated from an eluting curve in the following manner were:

$T_{max}$: temperature (° C.) at which maximized is an eluted component in a primary peak present in a temperature range of exceeding 0° C. and 130° C. or lower in an eluting curve $T_{40}$: temperature (° C.) at which an eluted component accounts for 40% by weight based on the whole eluted components $T_{60}$: temperature (° C.) at which an eluted component accounts for 60% by weight based on the whole eluted components The primary peak described above is, in the case of a single peak, this peak itself, and when plural peaks are present, it is distinguished dividing them into (a) a peak having at least one shoulder, (b) two or more peaks present and (c) a peak in which (a) and (b) described above are mixedly present. In the case of (a), a peak excluding a shoulder is designated as the primary peak, and in the case of (b), the primary peak is defined by a peak in which an accumulated value based on the respective peaks has a maximum value in an accumulative curve of an eluting curve. In the case of (c), the presence of a shoulder is first observed, and when the shoulder is present, a peak excluding the shoulder is designated as the primary peak.

(a) Operating Method

The sample was completely dissolved in orthodichlorobenzene heated at a temperature of 140° C. to prepare a sample solution, and it was introduced into a TREF column controlled to a temperature of 135° C. Then, the temperature was gradually lowered down to 0° C. at a rate of 5° C./hour to allow the sample to be adsorbed on a filler. Then, after maintaining at 0° C. for 30 minutes, orthodichlorobenzene is passed through the column, and the column was maintained at 0° C. for 10 minutes to allow the components which were not adsorbed on the filler to be eluted. Then, the column was heated up to 135° C. at a heating rate of 40° C./hour while passing orthodichlorobenzene therethrough to elute in order the polymer components, and the concentrations of the eluted polymers were determined, whereby an eluting curve was obtained.

Linear high density polyethylene (U.S. Department of Commerce National Institute of Standards and Technology, SRM1475) was measured to find that the eluted peak thereof had a temperature $T_{max}$ of 100.6° C.

(b) Measuring Apparatus

TREF column: silica gel column (4.6φ×150 mm), manufactured by GL Science Co., Ltd.

Flow cell: KBr cell having an optical path length of 1 mm, manufactured by GL Science Co., Ltd.

Delivering pump: SSC-3100, manufactured by Senshu Science Co., Ltd.

Valve oven: Model 554, manufactured by GL Science Co., Ltd.

TREF oven: manufactured by GL Science Co., Ltd.

Two-series temperature controller: REX-C100, manufactured by Rigaku Kogyo Co., Ltd.

Concentration detector: MIRAN 1A CVF, infrared detector for liquid chromatography, manufactured by Foxboro Co., Ltd.

Ten way valve: motor-driven valve, manufactured by Balco Co., Ltd.

Loop: 500 microliter loop, manufactured by Balco Co., Ltd.

(c) Measuring Conditions

Solvent: o-dichlorobenzene

Sample concentration: 7.5 g/liter

Charge amount: 500 microliter

Pump flow rate: 2.0 ml/minute

Detection wave number: 3.41 μm

Column filler: Chromosolve P (30/60 mesh)

Column temperature distribution: within ±0.2° C.

(5) Evaluating Method for Heat History

The melt tension was measured on the following conditions by means of the following apparatus. A change rate ($MT_1/MT_0$) of the melt tension caused by heat history was determined, wherein $MT_0$ is a melt tension of the propylene homopolymer or the propylene copolymer before subjected to heat history, and $MT_1$ is a melt tension of the propylene homopolymer or the propylene copolymer after subjected to heat history.

Apparatus: 20 mm single shaft extruding machine

Resin temperature: 260±10° C.

Residence time: 60±1 seconds

Extrusion atmosphere: nitrogen atmosphere

Sample: pelletized propylene homopolymer or propylene copolymer containing additives such as an antioxidant and the like (6) Deterioration Parameter The sample 20 g was put in a small-sized two-shaft mixer Lab Plastomill manufactured by Toyo Seiki Co., Ltd. and kneaded at a set temperature of 190° C. and a revolution of 50 rpm for 5 minutes. Further, a viscoelasticity-measuring apparatus (RMS-80) manufactured by Rheometrix Co., Ltd. was used to carry out measurement at a set temperature of 190° C.

A deterioration parameter D was calculated from a storage modulus G' at a frequency of 0.01 rad/s according to the following equation:

$$D=G'_a/G'_b$$

($G'_a$ is a storage modulus after kneading, and $G'_b$ is a storage modulus before kneading).

Example 1

(1) Preparation of Support $SiO_2$ (brand name: P-10, manufactured by Fuji Silicia Chemical Co., Ltd.) 70 g was subjected to drying treatment at 140° C. for 15 hours under a trace amount of nitrogen to obtain dry $SiO_2$. Weighed was 22.0 g of this dry $SiO_2$, and it was put in 200 ml of dehydrated toluene. The temperature was fixed at 40° C. while stirring under nitrogen atmosphere, and then a toluene solution (1 mole/liter) of triisobutylaluminum was dropwise added thereto in an amount of 0.5 millimole in terms of an aluminum atom. They were reacted for 5 hours, and then the solid matter was washed twice with 200 ml of dehydrated toluene at 40° C. by decantation. After washing, 250 ml of dehydrated toluene was added thereto.

(2) Preparation of Aluminumoxy Compound

Methylaluminoxane was used as an aluminumoxy compound. A solvent was distilled off from 1.0 liter of a toluene solution of methylaluminoxane (1.5 mole/liter, containing 14.5% by weight of trimethylaluminum, manufactured by Albemal Co., Ltd.) at 60° C. under reduced pressure (20 mm Hg) to dry it up. After maintaining it in this state for 4 hours, it was cooled down to a room temperature to obtain dried-up methylaluminoxane. Dehydrated toluene was added to this dried-up methylaluminoxane and dissolved again to recover the volume which was present before distilling off the solvent, and trimethylaluminum contained in methylaluminoxane was determined by means of $^1$H-NMR to result in finding that it was 3.6% by weight. Further, the whole aluminum amount was measured by a fluorescent X-ray (ICP) method to result in finding that it was 1.32 mole/liter. Then, this solution was left standing still for two whole days and nights to settle down insoluble components. Thereafter, the supernatant was filtered through a G5 glass-made filter under nitrogen flow to recover the supernatant and obtain methylaluminoxane as an aluminumoxy compound. The concentration thereof determined by the ICP method was 1.06 mole/liter. The measurements carried out above showed that 10.9% by weight of the organic aluminum and 17.3% by weight of the insoluble components were removed.

(3) Preparation of Supported Methylaluminoxane

The toluene slurry of $SiO_2$ prepared in (1) described above was stirred under nitrogen atmosphere to control the temperature to 0° C. The soluble methylaluminoxane solution prepared in (2) described above was dropwise added thereto in 60 minutes. After finishing dropwise adding, the temperature was elevated up to a room temperature to react them for 30 minutes. Further, the temperature was elevated up to 70° C. to continue the reaction for 3 hours in this state. After finishing the reaction, the temperature was lowered down to 60° C. to wash the mixture twice with dehydrated toluene while maintaining this temperature, and it was continued to be washed twice with dehydrated toluene. After washing, the mixture was dried up at 50° C. under reduced pressure to obtain 32.8 g of $SiO_2$-supported type methylaluminoxane. Added again was 186 ml of dehydrated heptane to prepare a heptane slurry of $SiO_2$-supported methylaluminoxane.

(4) Preparation of Metallocene-Supported Catalyst

After a shrenck of 200 ml was substituted with dry nitrogen, added under nitrogen atmosphere were 80 ml of dry heptane and 20 millimole of $SiO_2$-supported methylaluminoxane described above in terms of an aluminum atom, and then the mixture was stirred at a room temperature. Slowly dropwise added thereto was 1 ml (20 micromole in terms of a zirconium atom) of a toluene solution of racemi-dimethylsilylenebis(2-methyl-4-phenylindenyl) zirconium dichloride [rac-Me$_2$Si (2-Me-4-PhInd)$_2$ZrCl$_2$], and then carrying reaction was executed for 20 minutes while stirring. The supported catalyst was changed to an orange color, and a color which was intrinsic to a zirconium compound was not observed at all in a solution part obtained after the catalyst slurry was left standing still. Thus, it was confirmed that the zirconium compound was supported.

Further, dropwise added thereto was 2 ml of a toluene solution containing 25 micromole of racemi-(1,2'-ethylene)(2,1'-ethylene)bisindenylhafnium dichloride [rac-Et$_2$(Ind)$_2$HfCl$_2$] in terms of a hafnium atom, and then the reaction was further carried out for 40 minutes while stirring.

(5) Production of Polypropylene

A stainless steel-made pressure proof autoclave of 5 liters was charged with 2400 ml of dehydrated heptane and 3 millimole of triisobutylaluminum and stirred for 10 minutes. The polymerization catalyst prepared in (4) corresponding to 20 micromole in terms of a zirconium atom was added thereto. The polymerization temperature was controlled to 25° C. while stirring, and propylene was continuously fed so that a polymerization pressure of propylene was 0.59 MPa·G to carry out pre-polymerization for 80 minutes after the pressure rose. Next, propylene was depressurized in 40 minutes, and then propylene was continuously fed so that the polymerization temperature was 80° C. and a polymerization pressure of propylene was 0.098 MPa·G to carry out the polymerization for 2 hours (step 1). After finishing the polymerization, propylene was further continuously fed so that the polymerization temperature was 70° C. and a polymerization pressure of propylene was 0.69 MPa·G to carry out the polymerization for 5.5 hours (step 2). The autoclave was depressurized and opened, and the polymer was recovered and dried to obtain 1095 g of polypropylene. The analytical results of this polypropylene are shown in Table 1. This polypropylene was subjected to heat history by the method described above to determine a melt tension and a change rate thereof before and after the heat history. The results thereof are shown in Table 3.

Example 2

Production of Propylene Copolymer

A catalyst component was prepared in the same manner as in Example 1.

A stainless steel-made pressure proof autoclave of 1.6 liter was charged with 400 ml of dehydrated heptane and 0.5 millimole of triisobutylaluminum and stirred for 10 minutes. The catalyst prepared in the same manner as in Example 1 corresponding to 5 micromole in terms of a zirconium atom was added thereto. The polymerization temperature was elevated up to 80° C. while stirring, and the monomers were continuously fed at a flow amount ratio of propylene/ethylene fixed to 10/0.5 so that the polymerization pressure was 0.098 MPa·G to carry out the polymerization for 120 minutes (polymerization reaction 1). After finishing the polymerization reaction 1, the monomers were continuously fed at a polymerization temperature of 55° C. and a flow amount ratio of propylene/ethylene fixed to 10/0.5 so that the polymerization pressure was 0.69 MPa·G to carry out the polymerization for 60 minutes (polymerization reaction 2).

The autoclave was depressurized and opened, and the copolymer was recovered and dried to obtain 120 g of the copolymer. The copolymer composition was determined by NMR measurement according to a conventional method. The results thereof are shown in Table 2 together with the analytical results thereof.

Example 3

Production of Propylene Block Copolymer

A catalyst component was prepared in the same manner as in Example 1.

A stainless steel-made pressure proof autoclave of 2.0 liters was charged with 800 ml of dehydrated heptane and 1.0 millimole of triisobutylaluminum and stirred for 10 minutes. The catalyst prepared in the same manner as in Example 1 corresponding to 5 micromole in terms of a zirconium atom was added thereto. The polymerization temperature was controlled to 25° C. while stirring, and propylene was continuously fed so that a polymerization pressure of propylene was 0.59 MPa·G to carry out pre-polymerization for 80 minutes after the pressure rose. Next, propylene was depressurized in 40 minutes, and then propylene was continuously fed so that the polymerization temperature was 80° C. and a polymerization pressure of propylene was 0.098 MPa·G to carry out the polymerization for 2 hours (step 1). After finishing the polymerization, propylene was further continuously fed so that the polymerization temperature was 70° C. and a polymerization pressure of propylene was 0.69 MPa·G to carry out the polymerization for 5.5 hours (step 2).

After finishing the polymerization reaction, the polymerization temperature was controlled to 30° C., and the monomers were continuously fed at a flow amount ratio of propylene/ethylene fixed to 10/0.5 so that the polymerization pressure was 0.69 MPa·G to carry out the polymerization for 100 minutes (step 3). The autoclave was depressurized and opened, and the copolymer was recovered and dried to obtain 270 g of the copolymer. The copolymer composition was determined by NMR measurement according to a conventional method. The results thereof are shown in Table 2 together with the analytical results thereof.

Example 4

Production of Soft Propylene Polymer (1) Preparation of Metallocene Catalyst

Dissolved in 10 ml of toluene was 40 micromole of rac-(1,2'-SiMe$_2$) (2,1'-SiMe$_2$)bis (3-butylindenyl) zirconium dichloride and 40 micromole of rac-(1,2'-ethylene)(2,1'-ethylene)bis(indenyl)hafnium dichloride to prepare a mixed catalyst solution.

(2) Polymerization of Propylene

A stainless steel-made pressure proof autoclave of 1.6 liter was charged with 600 ml of dehydrated heptane and 0.5 millimole of triisobutylaluminum and stirred for 10 minutes. The catalyst prepared in (1) corresponding to 5 micromole in terms of a zirconium atom was added thereto. The polymerization temperature was elevated up to 80° C. while stirring, and propylene was continuously fed so that a polymerization pressure of propylene was 0.098 MPa·G to carry out the polymerization for 200 minutes (polymerization reaction 1). After finishing the polymerization reaction 1, propylene was continuously fed so that the polymerization temperature was 65° C. and the polymerization pressure was 0.69 MPa·G to carry out the polymerization for 30 minutes (polymerization reaction 2). The autoclave was depressurized and opened, and polypropylene was recovered and dried to obtain 150 g of polypropylene. The analytical results thereof are shown in Table 1.

Example 5

Production of Polypropylene (1) Preparation of Catalyst Component

A supported catalyst was prepared in the same manner as in Example 1, except that in (4) preparation of the metallocene-supported catalyst in Example 1, used were 30 micromole of racemi-dimethylsilylenebis(2-methyl-4-phenylindenyl)zirconium dichloride in terms of a zirconium atom and 5 micromole of racemi-(1,2'-ethylene)(2,1'-ethylene)bisindenylhafnium dichloride in terms of a hafnium atom.

(2) Production of Polypropylene

A stainless steel-made pressure proof autoclave of 1.6 liter was charged with 400 ml of dehydrated heptane and 0.5 millimole of triisobutylaluminum and stirred for 10 minutes. The catalyst prepared in (1) corresponding to 2 micromole in terms of a zirconium atom was added thereto. The polymerization temperature was controlled to 25° C. while stirring, and propylene was fed so that a polymerization pressure of propylene was 0.3 MPa-G to carry out pre-polymerization for 30 minutes. After finishing the pre-polymerization, the autoclave was depressurized and substituted with nitrogen, and then it was charged with 30 ml of hydrogen at a room temperature. The polymerization temperature was controlled to 60° C., and propylene was fed while maintaining the pressure at 0.65 MPa·G to produce polypropylene in 90 minutes (step 1).

After 90 minutes, the autoclave was cooled down to a room temperature to remove the gas components such as unreacted propylene by depressurization and sufficiently purged by substitution with nitrogen. Next, the polymerization temperature was controlled to 40° C., and propylene was fed while maintaining the pressure at 0.65 MPa·G to produce polypropylene in 60 minutes (step 2).

After finishing the reaction, the autoclave was depressurized and opened, and the polymer was recovered and dried to obtain 152 g of polypropylene.

The analytical results of this polypropylene are shown in Table 2. The deterioration parameter (D) was 0.96.

Example 6

Production of Polypropylene

Polypropylene was produced in the same manner as in (2) of Example 5, except that in (2) of Example 5, the polymerization temperature in the step 2 was changed from 40° C. to 30° C. and the polymerization time was changed from 60 minutes to 7 hours. As a result thereof, 142 g of polypropylene was obtained.

The analytical results of this polypropylene are shown in Table 2. The deterioration parameter (D) was 0.97.

Comparative Example 1

Polypropylene for extrusion-forming molding (brand name: PF814) manufactured by Montel Polyolefins Co., Ltd. was evaluated in the same manner as in Example 1. This polypropylene is introduced as polypropylene improved in a melt index in Convertec, April issue, p. 8 to 11 (1998).

The results thereof are shown in Table 1. This polypropylene was subjected to heat history by the method described above to determine a melt tension and a change rate thereof before and after the heat history. The results thereof are shown in Table 3. The deterioration parameter (D) was 0.68.

TABLE 1

|  | Example |  | Comparative Example |
|---|---|---|---|
|  | 1 | 4 | 1 |
| Ethylene content (mol %) | 0 | 0 | 0 |
| MI (g/10 minute) | 0.60 | 1.10 | 2.94 |
| Z average molecular weight (Mz) | 891000 | 725000 | 1734000 |
| Mw/Mn | 4.5 | 4.2 | — |
| Melt tension log MT |  |  |  |
| Measured value | 0.92 | 0.73 | 1.23 |
| Calculated value | 0.575 | 0.380 | 0.357 |
| TREF Elution peak ($T_{max}$) (° C.) | 105.0 | 46.4 | 116.8 |
| TREF Elution width (° C.) ($T_{60}-T_{40}$) |  |  |  |
| Measured value | 1.0 | 7.9 | 1.87 |
| Calculated value | 21.8[a] | >80[a] | 1.51[b] |

TABLE 2

|  | Example |  |  |  |
|---|---|---|---|---|
|  | 2 | 3 | 5 | 6 |
| Ethylene content (mol %) | 1.3 | 2.5 | 0 | 0 |
| MI (g/10 minute) | 16.10 | 0.8 | 0.42 | 0.30 |
| Z average molecular weight (Mz) | 585000 | 823000 | 912000 | 1056000 |
| Mw/Mn | 4.5 | 3.8 | 4.8 | 5.3 |
| Melt tension log MT |  |  |  |  |
| Measured value | −0.097 | 0.90 | 1.08 | 1.19 |
| Calculated value | −0.319 | 0.487 | 0.66 | 0.78 |
| TREF Elution peak ($T_{max}$) (° C.) | 102.0 | 80.5 | 105.5 | 105.7 |
| TREF Elution width (° C.) ($T_{60}-T_{40}$) |  |  |  |  |
| Measured value | 1.2 | 3.1 | 1.0 | 1.0 |
| Calculated value | 2.79[c] | 30.2[c] | 16.7[a] | 15.1[a] |

Remarks:
(1) log MT calculated value: calculated fron $0.555 \times \log[Mz/MI] - 2.85$
(2) in [a], calculated from $\log[T_{60}-T_{40}] = -2.32 T_{max} + 25.70$ or set to $T_{60}-T_{40} = 80$
in [b], calculated from $T_{60}-T_{40} = 1.51$
in [c], calculated from $\log[T_{60}-T_{40}] = -0.047 T_{max} + 5.240$

TABLE 3

| (Melt tension) | Example 1 | Comparative Example 1 |
|---|---|---|
| Before heat history ($MT_0$) | 8.2 | 17.5 |
| After heat history ($MT_1$) | 8.1 | 9.5 |
| $MT_1/MT_0$ | 0.99 | 0.54 |

Example 7

Production of Thermoplastic Resin Composition
(1) Production of Polypropylene
a. Preparation of Supported Catalyst A supported catalyst was prepared in the same manner as in (4) of Example 1, except that used were 20 millimole of supported methylaluminoxane prepared in (4) of Example 1 in terms of an aluminum atom and 20 micromole of racemi-dimethylsilylenebis(2-methyl-4-phenylindenyl)zirconium dichloride in terms of a zirconium atom. One kind of the transition metal complex described above was used in this supported catalyst.

b. Production of Polypropylene

A stainless steel-made pressure proof autoclave of 5 liters was charged with 2000 ml of dehydrated heptane and 2 millimoles of triisobutylaluminum and stirred for 10 minutes. Added thereto was 20 micromoles of the polymerization catalyst prepared in a in terms of a zirconium atom. The polymerization temperature was controlled to 75° C. while stirring, and propylene was fed so that a polymerization pressure of propylene was 0.8 MPa·G to carry out the polymerization for 50 minutes. After finishing the reaction, the autoclave was depressurized and opened, and the polymer was recovered and dried to obtain 1240 g of polypropylene. The MI was 0.41.

(2) Production of Composition

The polypropylene produced in (1) described above and the polypropylene produced in Example 5 were molten and kneaded on conditions shown below by means of a kneading machine to obtain a pellet-shaped composition.

| (Composition ratio) | A | B (comparative example) |
|---|---|---|
| Polypropylene in Example 5 | 30% by weight | 0% by weight |
| Polypropylene in (1) described above | 70% by weight | 100% by weight |

Additive:
  Manufactured by Ciba Specialty Chemicals Co., Ltd.
    Iruganox 1010: 1000 ppm
    Irugafos 168: 1000 ppm As a result thereof, though B (comparative example) had a melt tension of 5.5 g, A (the composition of the present invention) had a melt tension of 8.2 g and was improved in a melt tension.

(3) Production of Molded Article

The kneaded pellet described above was used to carry out sheet extrusion molding, and it became clear according to visual observation that A (the composition of the present invention) was more excellent in a surface smoothness and necking than B (comparative example).

INDUSTRIAL APPLICABILITY

The propylene homopolymer or the propylene copolymer of the present invention has physical properties equivalent to or not lower than those of conventional propylene polymers, and it can be controlled in a melt tension and is suited to foaming molding, sheet molding and blow molding. Further, it is excellent in melt-processing characteristics, molding stability and a recycling property and can be applied to molding methods which are restricted in use in conventional propylene polymers, for example, large size blow molding and extrusion foaming molding.

What is claimed is:

1. A propylene homopolymer characterized by that:
   (a) a melt tension (MT) measured at a temperature of 230° C., a Z average molecular weight (Mz) determined by gel permeation chromatography and a melt index (MI) (g/10 minutes) measured at a temperature of 230° C. and a load of 21.2N satisfy the relation of an equation (1):

$$\log MT \geq 0.555 \times \log[Mz/MI] - 2.85 \quad (1)$$

and (b) a difference $[T_{60}-T_{40}]$ in eluting temperatures and a maximum eluting temperature $T_{max}$(°C) in programmed temperature fractional chromatography satisfy both of:

$$\log[T_{60}-T_{40}] \leq -0.232 T_{max} + 25.70 \quad (2)$$

$$T_{60}-T_{40} \leq 80 \quad (3)$$

in a range where $T_{max}$ is 110° C. or lower, wherein $T_{60}$ represents a temperature (°C) at which 60% by weight of the components is eluted, and $T_{40}$ represents a temperature (°C) at which 40% by weight of the components is eluted, or satisfy the relation of:

$$T_{60}-T_{40} \leq 1.51 \quad (4)$$

in a range where $T_{max}$ exceeds 110° C. and is 130° C. or lower.

2. The propylene homopolymer as described in claim 1, wherein a change rate $(MT_1/MT_0)$ of a melt tension caused by heat history falls in a range of 0.63 to 1.0, wherein $MT_0$ represents the melt tension of the propylene homopolymer before subjected to heat history, and $MT_1$ represents the melt tension of the propylene homopolymer after subjected to heat history.

3. The propylene homopolymer as described in claim 1, wherein a deterioration parameter D defined by a change rate $(DT_1/DT_0)$ of a melt viscosity caused by heat history is 0.7 or more, wherein $DT_0$ represents the melt viscosity of the propylene homopolymer before subjected to heat history, and $DT_1$ represents the melt viscosity of the propylene homopolymer copolymer after subjected to heat history.

4. A propylene copolymer characterized by that:
   (c) it is a propylene copolymer prepared by random-copolymerizing or block-copolymerizing propylene with at least one comonomer selected from ethylene and α-olefins having 4 to 20 carbon atoms and has a comonomer content of 0.05 to 60 mole %, and
   (d) a melt tension (MT) measured at a temperature of 230° C., a Z average molecular weight (Mz) determined by gel permeation chromatography and a melt index (MI) (g/10 minutes) measured at a temperature of 230° C. and a load of 21.2N satisfy the relation of an equation (1):

$$\log MT \geq 0.555 \times \log[Mz/MI] - 2.85 \quad (1).$$

5. The propylene copolymer as described in claim 4, wherein a difference $[T_{60}-T_{40}]$ in eluting temperatures and a maximum eluting temperature $T_{max}$(°C) in programmed temperature fractional chromatography satisfy both of:

$$\log[T_{60}-T_{40}] \leq -0.047 T_{max} + 5.240 \quad (5)$$

$$T_{60}-T_{40} \leq 80 \quad (6)$$

in a range where $T_{max}$ is 102° C. or lower wherein $T_{60}$ represents a temperature (°C) at which 60% by weight of the components is eluted, and $T_{40}$ represents a temperature (°C) at which 40% by weight of the components is eluted, or satisfy the relation of:

$$T_{60}-T_{40} \leq 2.79 \quad (7)$$

in a range where $T_{max}$ exceeds 102° C. and is 125° C. or lower.

6. The propylene copolymer as described in claim 4, wherein a change rate $(MT_1/MT_0)$ of a melt tension caused by heat history falls in a range of 0.63 to 1.0, wherein $MT_0$ represents the melt tension of the propylene copolymer before subjected to heat history, and $MT_1$ represents the melt tension of the propylene copolymer after subjected to heat history.

7. The propylene copolymer as described in claim 4, wherein a deterioration parameter D defined by a change rate $(DT_1/DT_0)$ of a melt viscosity caused by heat history is 0.7 or more, wherein $DT_0$ represents the melt viscosity of the propylene copolymer before subjected to heat history, and $DT_1$ represents the melt viscosity of the propylene copolymer after subjected to heat history.

8. A thermoplastic resin composition comprising 10 to 99% by weight of a thermoplastic resin and 1 to 90% by weight of the propylene homopolymer as described in claim 1 and/or a propylene copolymer wherein
   (c) it is a propylene copolymer prepared by random-copolymerizing or block-copolymerizing propylene with at least one comonomer selected from ethylene and α-olefins having 4 to 20 carbon atoms and has a comonomer content of 0.05 to 60 mole %, and
   (d) a melt tension (MT) measured at a temperature of 230° C., a Z average molecular weight (Mz) determined by gel permeation chromatography and a melt index (MI) (g/10 minutes) measured at a temperature of 230° C. and a load of 21.2N satisfy the relation of an equation (1):

$$\log MT \geq 0.555 \times \log[Mz/MI] - 2.85 \quad (1).$$

9. A molded article prepared by molding a propylene homopolymer having:
   (a) a melt tension (MT) measured at a temperature of 230° C., a Z average molecular weight (Mz) determined by gel permeation chromatography and a melt index (MI) (g/10 minutes) measured at a temperature of 230° C. and a load of 21.2N satisfy the relation of an equation (1):

$$\log MT \geq 0.555 \times \log[Mz/MI] - 2.85 \quad (1)$$

and (b) a difference $[T60-T_{40}]$ in eluting temperatures and a maximum eluting temperature $T_{max}$ (°C) in programmed temperature fractional chromatography satisfy both of:

$$\log[T_{60}-T_{40}] \leq -0.232 T_{max} + 25.70 \quad (2)$$

$$T_{60}-T_{40} \leq 80 \quad (3)$$

in a range where $T_{max}$ is 110° C. or lower, wherein $T_{60}$ represents a temperature (°C) at which 60% by weight of the components is eluted, and $T_{40}$ represents a temperature (°C) at which 40% by weight of the components is eluted, or satisfy the relation of:

$$T_{60}-T_{40} \leq 1.51 \quad (4)$$

in a range where $T_{max}$ exceeds 110° C. and is 130° C. or lower, a propylene copolymer wherein:
- (c) it is a propylene copolymer prepared by random-copolymerizing or block-copolymerizing propylene with at least one comonomer selected from ethylene and α-olefins having 4 to 20 carbon atoms and has a comonomer content of 0.05 to 60 mole %, and
- (d) a melt tension (MT) measured at a temperature of 230° C., a Z average molecular weight (Mz) determined by gel permeation chromatography and a melt index (MI) (g/10 minutes) measured at a temperature of 230° C. and a load of 21.2N satisfy the relation of an equation (1):

$$log\ MT \geq 0.555 \times log[Mz/MI] - 2.85, \tag{1}$$

or the thermoplastic resin composition as described in claim 8 via melt extrusion.

* * * * *

UNITED STATES PATENT AND TRADEMARK OFFICE
CERTIFICATE OF CORRECTION

| | | Page 1 of 1 |
|---|---|---|
| PATENT NO. | : 6,794,476 B2 | |
| APPLICATION NO. | : 10/070442 | |
| DATED | : September 21, 2004 | |
| INVENTOR(S) | : Machida et al. | |

It is certified that error appears in the above-identified patent and that said Letters Patent is hereby corrected as shown below:

On the title page, Item (30), the Foreign Application Priority Data is incorrect. Item (30) should read:

-- (30)      Foreign Application Priority Data

Jul. 24, 2000    (JP) ........................ 2000-221750 --

Signed and Sealed this

First Day of February, 2011

David J. Kappos
*Director of the United States Patent and Trademark Office*